US008438242B2

(12) United States Patent
Kishimoto

(10) Patent No.: US 8,438,242 B2
(45) Date of Patent: May 7, 2013

(54) INFORMATION-PROCESSING APPARATUS, SERVER, INFORMATION COMMUNICATION SYSTEM, INFORMATION-PROCESSING METHOD, INFORMATION PROVIDING METHOD, AND COMPUTER STORAGE MEDIUM

(75) Inventor: Toyoaki Kishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 895 days.

(21) Appl. No.: 11/439,281

(22) Filed: May 23, 2006

(65) Prior Publication Data
US 2006/0212546 A1  Sep. 21, 2006

Related U.S. Application Data

(63) Continuation of application No. 09/876,738, filed on Jun. 7, 2001, now Pat. No. 7,062,543.

(30) Foreign Application Priority Data

Jun. 8, 2000 (JP) ................................. 2000-177145

(51) Int. Cl.
G06F 15/16 (2006.01)
G06F 15/173 (2006.01)
G06F 13/00 (2006.01)

(52) U.S. Cl.
USPC ........... 709/219; 709/211; 709/224; 709/225; 711/165; 711/169

(58) Field of Classification Search .................. 709/219, 709/225, 211, 224; 711/165, 169
See application file for complete search history.

(56) References Cited

U.S. PATENT DOCUMENTS

| 5,440,686 | A | * | 8/1995 | Dahman et al. ............... 345/537 |
| 5,617,518 | A |   | 4/1997 | Kuwamoto et al. .......... 358/1.15 |
| 5,724,552 | A | * | 3/1998 | Taoda ........................... 711/165 |
| 5,764,972 | A | * | 6/1998 | Crouse et al. ........................ 1/1 |
| 5,893,120 | A | * | 4/1999 | Nemes ................................... 1/1 |
| 6,269,382 | B1 |   | 7/2001 | Cabrera et al. ................ 707/204 |
| 6,324,582 | B1 |   | 11/2001 | Sridhar et al. ................ 709/230 |
| 6,351,847 | B1 | * | 2/2002 | Sakamoto et al. ............. 717/127 |
| 6,360,220 | B1 |   | 3/2002 | Forin ................................ 707/8 |

(Continued)

FOREIGN PATENT DOCUMENTS

EP  0 811 911  12/1997
EP  0 811 942  12/1997

(Continued)

*Primary Examiner* — Peter Shaw
(74) *Attorney, Agent, or Firm* — Frommer Lawrence & Haug LLP; William S. Frommer

(57) ABSTRACT

The object of the invention is to provide the user with improved operatability of an information-processing apparatus and usability of application programs as well as to implement rendering of services to download the application programs from a server to the information-processing apparatus. If storage means employed in the information-processing apparatus does not contain a free area with a storage size large enough for accommodating a desired application program and a data file relevant thereto to be downloaded from the server, an information communication system comprising the information-processing apparatus and the server automatically transfers application programs and data files from the storage means to an external recording medium such as the server itself to be saved therein in order to secure a free storage area in the storage means. The free storage area is used for storing a desired application program and a relevant data file which are to be downloaded from the server.

16 Claims, 13 Drawing Sheets

U.S. PATENT DOCUMENTS

| | | |
|---|---|---|
| 6,360,364 B1 | 3/2002 | Chen et al. .................... 711/169 |
| 6,393,470 B1 | 5/2002 | Kanevsky et al. ............ 709/219 |
| 6,470,396 B2 | 10/2002 | Tognazzini .................... 709/248 |
| 6,496,979 B1 | 12/2002 | Chen et al. .................... 717/178 |
| 6,507,727 B1 | 1/2003 | Henrick ...................... 455/3.06 |
| 6,523,166 B1 | 2/2003 | Mishra et al. ................. 717/174 |
| 6,539,230 B2 | 3/2003 | Yen ........................... 455/456.1 |
| 6,691,149 B1 | 2/2004 | Yokota et al. ................. 709/201 |
| 6,714,797 B1 | 3/2004 | Rautila ...................... 455/552.1 |
| 6,728,786 B2 | 4/2004 | Hawkins et al. ............. 709/248 |
| 6,748,491 B2 | 6/2004 | Rodriguez ................... 711/122 |
| 6,889,049 B2 | 5/2005 | Khawand ................... 455/452.1 |
| 2002/0046216 A1* | 4/2002 | Yamazaki et al. ............ 707/201 |
| 2004/0122873 A1* | 6/2004 | Wright et al. ................. 707/205 |

FOREIGN PATENT DOCUMENTS

| | | |
|---|---|---|
| FR | 2 777 673 | 10/1999 |
| JP | 5 81036 | 4/1993 |
| JP | 7 175916 | 7/1995 |
| JP | 10 161879 | 6/1998 |
| JP | 10 269078 | 10/1998 |
| JP | 10 340187 | 12/1998 |
| JP | 11 296453 | 10/1999 |
| JP | 11 353240 | 12/1999 |

* cited by examiner

- RESOURCE DATABASE
  (CORRESPONDING TO THE EXECUTION FILE)
- DATABASE DATABASE
  (CORRESPONDING TO A DATA FILE)

FIG. 7

| ENTRY COUNT=4 | | | TABLE SIZE=0x1000 | | |
|---|---|---|---|---|---|
| APPLICATION ID | APPLICATION NAME | ACTIVATION COUNT | SAVE FLAG | TEMPORARY ATTRIBUTE | ADDRESS |
| 1 | MAP OF AKIHABARA | 24 | 1 | 0 | NULL |
| 2 | Palmscape | 256 | 0 | 0 | 0x130000 |
| 3 | MultiMail | 384 | 0 | 0 | 0x120000 |
| 4 | GO WITH A LOTTERY | 51 | 0 | 1 | 0x100000 |

US 8,438,242 B2

INFORMATION-PROCESSING APPARATUS, SERVER, INFORMATION COMMUNICATION SYSTEM, INFORMATION-PROCESSING METHOD, INFORMATION PROVIDING METHOD, AND COMPUTER STORAGE MEDIUM

CROSS-REFERENCE TO RELATED APPLICATIONS

The present application is a continuation application of U.S. Ser. No. 09/876,738, filed Jun. 7, 2004, now U.S. Pat. No. 7,062,503, having a claim of priority under 35 U.S.C. 119 to Japanese application 2000-177195, filed in Japan on Jun. 8, 2000, the entirety of which is incorporated herein by reference.

BACKGROUND OF THE INVENTION

In general, the present invention relates to an information-processing apparatus, a server and an information communication system. More particularly, the present invention relates to processing to download application software.

Information-processing apparatuses such as a personal computer and a PDA (Personal Digital Assistant) have been becoming popular and are used in various kinds of processing.

In addition, application software used in an information-processing apparatus is presented to the user by using media such as a disc or a memory card or downloaded to the apparatus through a communication line.

By the way, in the case of a portable and compact information-processing apparatus such as a PDA, the size of a memory source thereof is unavoidably limited. Thus, when an application program is installed in an internal storage unit, the storage area becomes full in many cases.

When the user wants to further add a new application program in such a circumstance, the user needs to delete or save an already installed program or an already installed data file in another storage medium in order to secure a storage area in the internal storage unit. The already installed application program or data file to be saved may be a program no longer needed or not used frequently. Then, it is necessary to carry out an operation to add the new application program to the existing software by installing the program in the secured storage area.

However, stress is much developed in the user by the fact that it is difficult as well as cumbersome to carry out the work to form of a judgment as to whether or not an already installed application program or data file is still required, the fact that it takes labor to carry out the work of deleting an existing application program or data file no longer required or used infrequently and the fact that the work to set a location for saving an application program or a data file and to set a connection to the location is troublesome. It takes also much time to carry out these works. The user's stress and the much time caused by these works are a problem.

In addition, due to such much consumed time and labor, the user gives up services rendered by typically a provider using servers even if the provider is capable of providing the user with application programs desired by the user.

SUMMARY OF THE INVENTION

It is thus an object of the present invention addressing the problems described above to enable addition of application programs without requiring the user to bear an excessively heavy operation load even if the size of the memory resource is limited, and to simplify use of a service rendered by a server to download application programs so as to increase interests of both the user and the server.

According to a first aspect of the invention, there is provided an information-processing apparatus comprising storage means for storing application programs and data files; processing means for activating an application program stored in the storage means to carry out required processing; communication means for communicating data with an external server; and control means for controlling the communication means and the storage means; wherein the control means controls the communication means and the storage means in such a manner that when an application program is downloaded from the server connected by the communication means, if the storage means has a free storage area left in which the application program is allowed to be installed, the application program downloaded from the server is installed in the storage means; but if the storage means has no free storage area left in which the application program is allowed to be installed, an application program or a data file stored in the storage means is saved to an external recording medium by way of the communication means in order to allocate a free storage area in the storage means and then the application program transmitted from the server is installed in the storage means.

According to a second aspect of the invention, there is provided a server comprising communication means for carrying out communications of data; downloaded-data storage means for storing a variety of application programs to be downloaded; saved-data storage means; and control means for controlling the communication means, the downloaded-data storage means, and the saved-data storage means; wherein when the server receives a download request from an information processing apparatus connected to the server via the communicating means for carrying out communications of data, the control means transmits an application program stored in the downloaded-data storage means to the information processing apparatus, and when the server receives a saving request from the information apparatus, the control means stores an application program or a data file transmitted from the information processing apparatus in the saved-data storage means as saved data.

According to a third aspect of the invention, there is provided an information communication system including an information-processing apparatus and a server connected to the information-processing apparatus in a state of being able to exchange data with the information-processing apparatus, the information-processing apparatus comprising storage means for storing application programs and data files; processing means for activating an application program stored in the storage means to carry out required processing; communication means for communicating data with an external server; and control means for controlling the communication means and the storage means; wherein the control means controls the communication means and the storage means in such a manner that when an application program is downloaded from the server connected by the communication means, if the storage means has a free storage area left in which the application program is allowed to be installed, the application program downloaded from the server is installed in the storage means; but if the storage means has no free storage area left in which the application program is allowed to be installed, an application program or a data file stored in the storage means is saved to an external recording medium by way of the communication means in order to allocate a free storage area in the storage means and then the application program transmitted from the server is installed in the storage means, on the other hand, the server comprising communication means for carrying out communications of data; downloaded-data storage means for storing a variety of application programs to be downloaded; saved-data storage means; and control means for controlling the communication means, the downloaded-data storage means, and the saved-data storage means; wherein when the server receives a download request from an information processing apparatus connected to the server via the communicating means for carrying out communications of data, the control means transmits an application program stored in the downloaded-data storage means to the information processing apparatus, and when the server receives a saving request from the information apparatus, the control means stores an application program or a data file transmitted from the information processing apparatus in the saved-data storage means as saved data.

According to a forth aspect of the invention, There is provided an information-processing method comprising the steps of storing application programs and data files in a storing means; activating an application program stored in the storage means to carry out required processing by a processing means; communicating data with an external server by way of a communication means; and controlling the communication means and the storage means by a control means; wherein the control means controls the communication means and the storage means in such a manner that when an application program is downloaded from the server connected by the communication means, if the storage means has a free storage area left in which the application program is allowed to be installed, the application program downloaded from the server is installed in the storage means; but if the storage means has no free storage area left in which the application program is allowed to be installed, an application program or a data file stored in the storage means is saved to an external recording medium by way of the communication means in order to allocate a free storage area in the storage means and then the application program transmitted from the server is installed in the storage means.

According to a fifth aspect of the invention, there is provided an information providing method comprising the steps of carrying out communications of data by way of a communication means; storing a variety of application programs to be downloaded in a downloaded-data storage means; controlling the communication means, the downloaded-data storage means, and a saved-data storage means; wherein when a download request from an information processing apparatus connected to a server via the communicating means is received, the control means transmits an application program stored in the downloaded-data storage means to the information processing apparatus, and when a saving request from the information apparatus is received, the control means stores an application program or a data file transmitted from the information processing apparatus in the saved-data storage means as saved data.

According to a sixth aspect of the invention, there is provided an information providing program comprising the steps of storing application programs and data files in a storing means; activating an application program stored in the storage means to carry out required processing by a processing means; communicating data with an external server by way of a communication means; and controlling the communication means and the storage means by a control means; wherein the control means controls the communication means and the storage means in such a manner that when an application program is downloaded from the server connected by the communication means, if the storage means has a free storage area left in which the application program is allowed to be installed, the application-program downloaded from the server is installed in the storage means; but if the storage means has no free storage area left in which the application program is allowed to be installed, an application program or a data file stored in the storage means is saved to an external recording medium by way of the communication means in order to allocate a free storage area in the storage means and then the application program transmitted from the server is installed in the storage means.

According to a seventh aspect of the present invention an information providing program comprising the steps of carrying out communications of data by way of a communication means; storing a variety of application programs to be downloaded in a downloaded-data storage means; controlling the communication means, the downloaded-data storage means, and a saved-data storage means; wherein when a download request from an information processing apparatus connected to a server via the communicating means is received, the control means transmits an application program stored in the downloaded-data storage means to the information processing apparatus, and when a saving request from the information apparatus is received, the control means stores an application program or a data file transmitted from the information processing apparatus in the saved-data storage means as saved data.

That is to say, in accordance with the present invention, if the storage means of the information-processing apparatus includes no left free storage area with a size large enough for installing a new application program to be downloaded from the external server, the information communication system automatically saves an application program or a data file stored in the storage means to the server or an external recording medium on the communication network in order to allocate a free storage area in the storage means and then downloads the new application program from the external server, installing the new application program in the storage means.

In addition, if an application program or a data file saved in the external recording medium exists at completion of use of an active application program downloaded from the external server or at the time when the user finishes using it and carries out predetermined operation, the application program is deleted from the storage means in order to restore the saved application program or the saved data file from the external recording medium to the storage means and reestablish a state prior to downloading.

As a result, the user is capable of easily utilizing a variety of application programs provided by an external server without worrying about the memory resource.

BRIEF DESCRIPTION OF THE DRAWINGS

FIG. 7 is an explanatory diagram showing an activation-history table provided by the embodiment;

DETAILED DESCRIPTION OF THE PREFERRED EMBODIMENTS

A preferred embodiment of the present invention is explained in an order given below. An information-processing apparatus implemented by the embodiment is an information-processing apparatus functioning as the so-called PDA (Personal Digital Assistant).

1: External Appearance of the Information-Processing Apparatus
2: Configuration of the Information-Processing Apparatus
3: Structures of the OS and the Database
4: Network Configuration
5: Server
6: Processing to Download an Application Program from the Server to the Information-Processing Apparatus 1: External Appearance of the Information-Processing Apparatus FIGS. 1A to 1D are diagrams showing a typical external appearance of an information-processing apparatus implemented by the embodiment.

The information-processing apparatus 1 is a compact, light and portable apparatus functioning as the so-called PDA. A memory card 70 is mounted on the information-processing apparatus 1 as a recording medium. Data can be recorded and played back into and from the memory card 70.

It should be noted that the scope of the present invention is not limited to a portable information-processing apparatus. Instead, the present invention can be applied to information-processing apparatuses of all types represented mainly by the personal computer. In addition, recording media used by the information-processing apparatus 1 for recording data are not limited to the memory card 70. The recording media include a variety of other recording media such as a variety of other memory cards, an optical disc and a magneto-optical disc.

FIGS. 1A, 1B, 1C and 1D are diagrams showing respectively a plan view, a right-side view, a left-side view and a top view of a typical external appearance of the information-processing apparatus 1.

Figure 1:
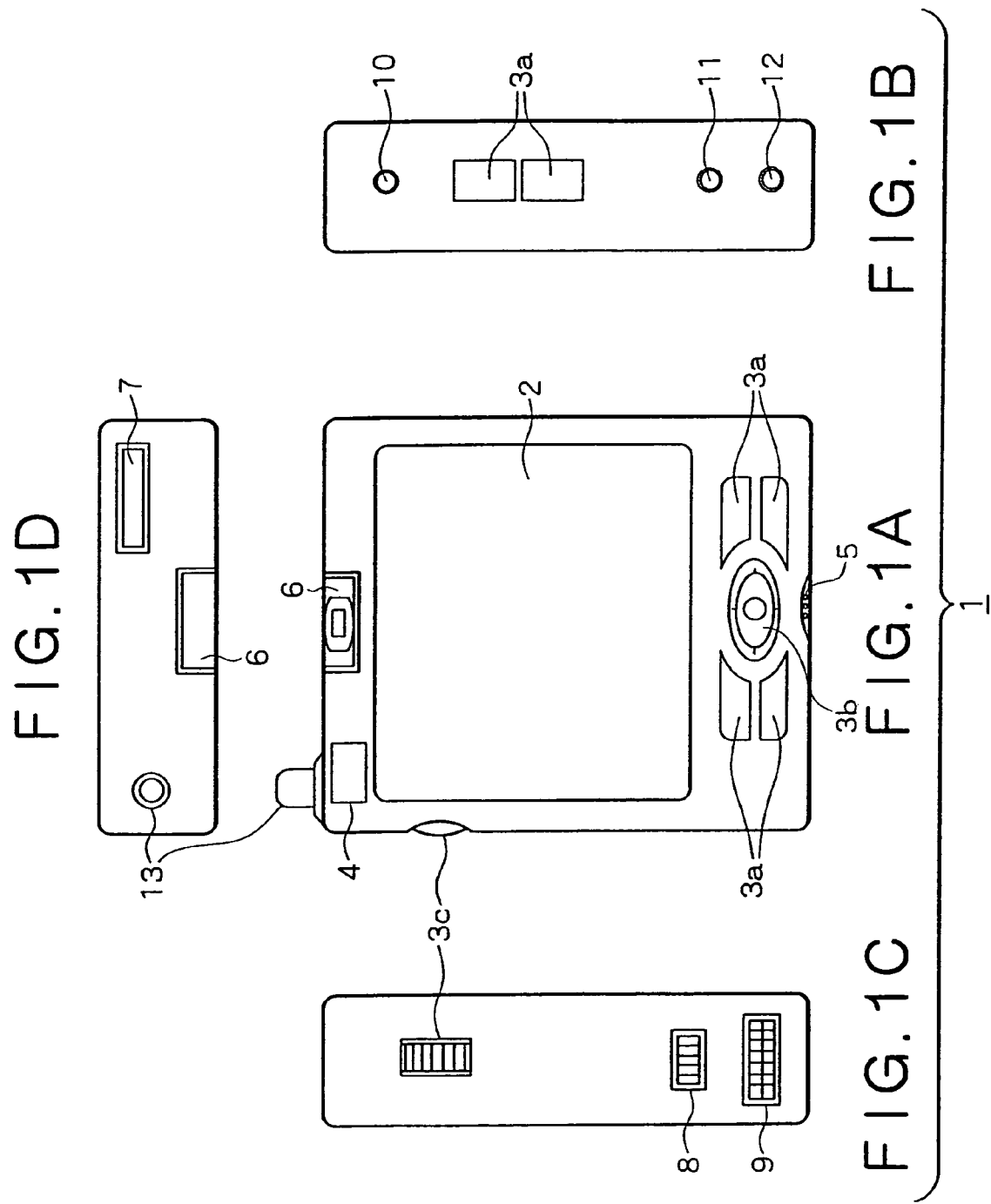
FIGS. 1A to 1D are diagrams showing a plan view, a right-side view, a left-side view and a top view of an information-processing apparatus implemented by an embodiment of the present invention.

As shown in FIG. 1D, memory slots 7 are created on the top-surface side of the information-processing apparatus 1. The memory slots 7 are each used for mounting a memory card 70 on the information-processing apparatus 1. The information-processing apparatus 1 is capable of recording and playing back various kinds of data into and from a memory card 70. The types of data include computer data, music data, audio data, moving-picture data, static-picture data and control data. Particularly, in the case of this embodiment, application programs and data files relevant to the application programs are recorded and played back into and from the memory card 70.

It should be noted that a plurality of memory cards 70 can be mounted at the same time on the 2 or more memory slots 7 created on the information-processing apparatus.

On the top surface of the information-processing apparatus 1, a display unit 2 implemented by typically a liquid-crystal panel is created. The display unit 2 is used for displaying various kinds of information such as pictures accompanying activation of application software and accompanying various kinds of processing, data in the form of pictures and characters, information added to a playback audio signal and added to playback music, a guide message giving an instruction as to how to carry out an operation and a menu screen for selecting playback and edit operations or the like.

The information-processing apparatus 1 is provided with a variety of operators to be operated by the user. The operators include main members such as operation keys 3a, 3b, and a jog dial 3c. The user is capable of carrying out a variety of necessary operations including an operation to turn on the power supply, an operation to operate a menu and select an item from the menu and an operation to enter data such as characters by operating these operators.

These operation keys 3a, the jog dial 3b and the push dial 3c are no more than typical operators. To be more specific, the number of operators, the types of the operators and their locations can be changed in a variety of conceivable ways.

In addition, the information-processing apparatus 1 also includes a speaker 4, a microphone 5 and a photographing unit 6. The speaker 4 is used for outputting a voice and/or a sound while the microphone 5 is used for inputting a voice and/or a sound. The photographing unit 6 is used for taking in a photographed picture.

Furthermore, a variety of terminals are provided for connecting the information-processing apparatus 1 to various kinds of equipment. For example, the terminals include a headphone terminal 10, a line-output terminal 12 and a line-input terminal 11 as shown in FIG. 1B. Moreover, as shown in FIG. 1C, an IEEE-1394 terminal 8 and a USB (Universal Serial Bus) terminal 9 are provided as well.

It should be noted that these terminals can have a variety of conceivable types and be located at different possible locations. The number of terminals may also vary from application to application.

For example, digital input/output terminals may also be provided for optical cables. It is also possible to provide other terminals such as an SCSI (Small Computer System Interface) connector, a serial port or an RS232C connector.

In addition, in the case of this information-processing apparatus 1, information can be downloaded from a predetermined server through a communication network such as a public network or from other sources such as Internet. An antenna 13 provided in this information-processing apparatus 1 is used for establishing a radio communication with a base station of a communication network.

2: Configuration of the Information-Processing Apparatus

Figure 2:
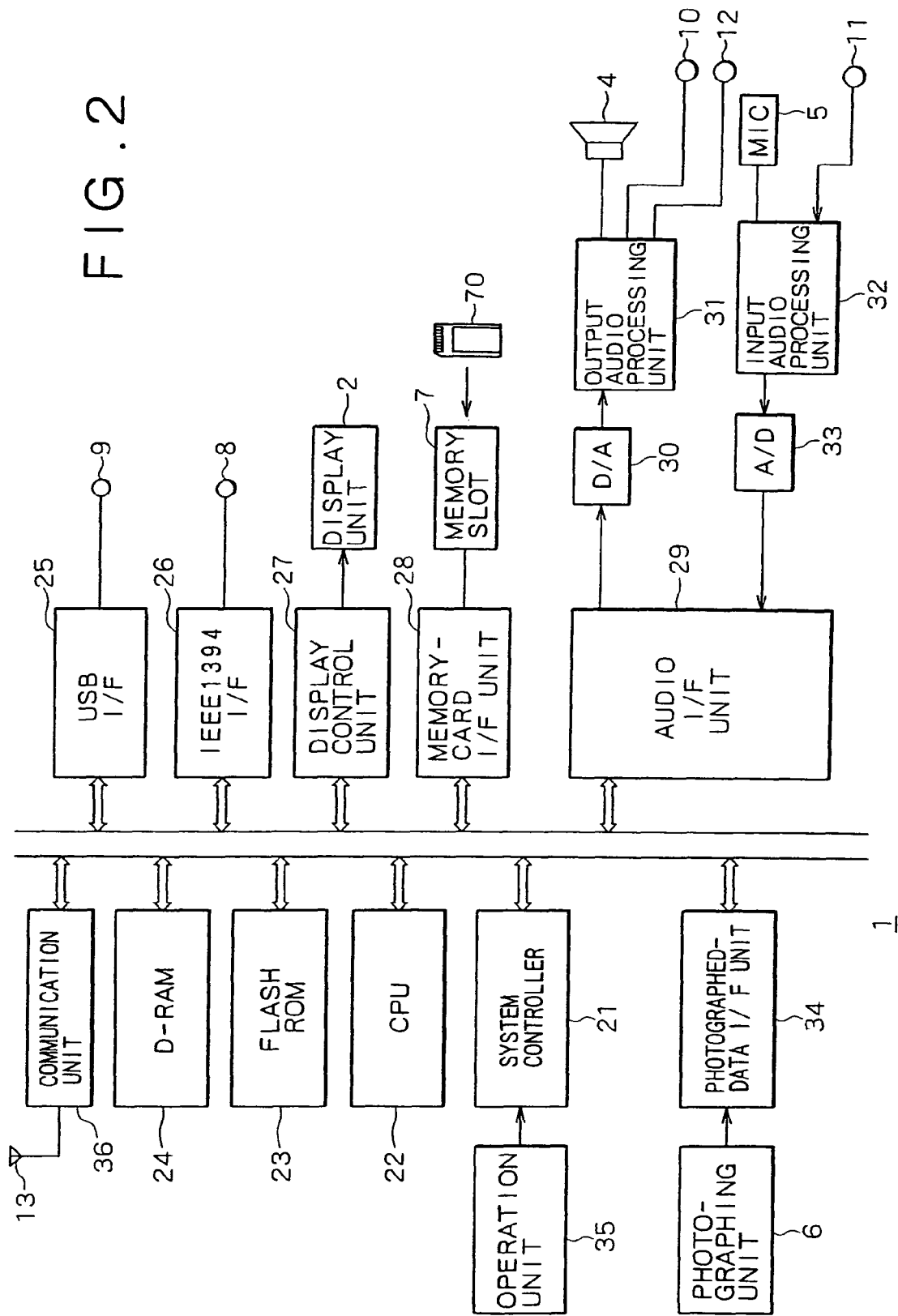
FIG. 2 is a block diagram showing the information-processing apparatus implemented by the embodiment.

FIG. 2 is a diagram showing the internal configuration of the information-processing apparatus 1. As shown in the figure, the information-processing apparatus 1 includes internal core members such as a system controller 21, a CPU (Central Processing Unit) 22, a flash ROM (Read-Only Memory) 23 and a D-RAM (Dynamic RAM) 24. In addition, the information-processing apparatus 1 also includes an operation unit 35, a display control unit 27 and a display unit 2, which each serve as a basic interface with the user.

The system controller 21 inputs information on an operation from the operation unit 35. Receiving the input, the system controller 21 interrupts the CPU 22.

The operation unit 35 corresponds to the operation keys 3a, the jog dial 3b and the push dial 3c, which are shown in FIGS. 1A to 1D. In addition, the display unit 2 also displays operation keys and icons. The displayed operation keys and icons are not described in the explanation with reference to FIGS. 1A to 1D. The display unit 2 also has a touch-detecting function using touch panel operators. In this case, the touch panel operators are included in the operation unit 35 shown in FIG. 2.

The CPU 22 is a member that executes basic software called an OS (Operating System) and application programs. The CPU 22 carries out necessary processing according to information on an operation. The information is supplied to the CPU 22 through the system controller 21.

The ROM 23 is used for storing a basic-operation program, a variety of processing constants and setting information among other data.

The D-RAM 24 is used for storing information requires in various kinds of processing. The D-RAM 24 also serves as a data buffer and an extension of a work area of the CPU 22. In addition, the D-RAM 24 is used for a number of purposes in dependence on processing carried out by the CPU 22. The D-RAM 24 includes a storage area which is a non-volatile area. In this storage area, the OS and application software are installed.

The user invokes the application software installed in the D-RAM 24 by carrying out an operation. Then, the CPU 22 executes the invoked application software.

The application software has a user-interface screen displayed by rendering a picture in a frame buffer allocated in the D-RAM 24. The picture rendering is based on a state transition triggered by a command issued by the user. The rendered-picture data is transferred to a display control unit 27 to be eventually displayed on the display unit 2.

In addition, the memory slots 7 are created for memory cards 70 as described earlier, allowing the memory cards 70 to be mounted on the information-processing apparatus 1. The CPU 22 is capable of making an access to any of the memory cards 70 through a memory-card interface unit 28 in write and read operations.

In this embodiment, a flash memory having a predetermined storage capacity is used as the memory card 70. The flash memory is enclosed in a case. As concrete typical dimensions, the case has a depth W11 of 60 mm, a width W12 of 20 mm and a thickness W13 of 2.8 mm.

In such a memory card 70, the storage capacity of the flash memory 81 is prescribed to be 4 MB (mega bytes), 8 MB, 16 MB, 32 MB, 64 MB or 128 MB.

The so-called FAT file system cited above is used as a file system for recording and playing back data.

The CPU 22 is capable of using any of the memory cards 70 mounted on the memory slots 7 as a memory-area extension.

In addition, it is needless to say that an application program stored in one of the memory cards 70 can be installed in the D-RAM 24. As an alternative, by loading an application and data from one of the memory cards 70 into the D-RAM 24, necessary processing can be carried out.

Furthermore, by executing a desired application program, the CPU 22 is capable of recording various kinds of data such as created text data, picture data, audio data and tabulated data into one of the memory cards 70.

It should be noted that, when the information-processing apparatus 1 detects an operation to mount a memory card 70 on one of the memory slots 7, the information-processing apparatus 1 allows recording and playback operations to be carried out on the memory card 70 or performs the so-called hot plug-in operation wherein an application program and data stored in the memory card 70 are automatically expanded in the D-RAM 24.

The memory-card interface unit 28 is capable of encoding data to be stored in the memory card 70 and decoding data read out from the memory card 70.

The photographing unit 6 typically comprises a CCD photographing device and a photographing circuit system. Data of a photographed picture taken by the photographing unit 6 can be stored in the D-RAM 24 by way of a photographed-data interface unit 34. By execution of predetermined application programs, the CPU 22 is capable of editing data of a photographed picture and recording the data into the memory card 70.

An audio interface unit 29 is an interface member for outputting data to the speaker 4, the headphone terminal 10 and the line-output terminal 12 as well as inputting data from the microphone 5 and the line-input terminal 11.

For example, an analog audio signal input from the microphone 5 or the line-input terminal 11 is subjected to predetermined amplification and predetermined filtering in an input-audio-processing unit 32. A signal output by the input-audio-processing unit 32 is converted by an A/D converter 33 into digital audio data, which is then supplied to the audio interface unit 29. Controlled by the CPU 22, the audio interface unit 29 processes the digital audio data received from the A/D converter 33. Typically, the digital audio data is subjected to a compression and encoding process in the audio interface unit 29. The audio interface unit 29 outputs a result of the process to the memory-card interface unit 28 to be recorded in the memory card 70. On the other hand, the audio interface unit 29 carries out a predetermined decoding process on digital audio data read out and supplied from the memory card 70 and supplies a result of decoding to a D/A converter 30 for converting the digital audio data into an analog audio signal. An output-audio-processing unit 31 carries out predetermined processes such as amplification and impedance adjustment, which conform to an output destination of the signal, on the analog audio signal received from the D/A converter 30. The output destination of a signal produced by the output-audio processing unit 31 can be the speaker 4, the headphone terminal 10 or the line-output terminal 12.

A USB interface unit 25 is a communication interface unit for interfacing with an external apparatus connected to a USB connector 9. The CPU 22 is capable of communicating data with a personal computer connected externally or another external apparatus such as a peripheral through the USB interface unit 25. Examples of data communicated between the CPU 22 and an external apparatus through the USB interface unit 25 are application software and a data file, which are handled in the information-processing apparatus 1. A data file contains typically picture data and audio data.

By the same token, an IEEE-1394 interface unit 26 is a communication interface unit for interfacing with an external apparatus connected to an IEEE-1394 connector 8. The CPU 22 is capable of communicating various kinds of data with the external apparatus through the IEEE-1394 interface unit 26.

A communication unit 36 is a member for communicating information with an external server, Internet homepage or the like through typically a communication network. Particularly in the case of this embodiment, the information-processing apparatus 1 is capable of downloading application software and data files from typically an external server through the communication unit 36.

The CPU 22 downloads an application program by way of the communication unit 36 and installs the program into the D-RAM 24 to be activated automatically.

The information-processing apparatus 1 implemented by this embodiment is exemplified as a radio communication terminal communicating with a communication network. It should be noted, however, that the information-processing apparatus 1 can also be provided with a modem or a connection terminal connected to a public telephone network by a wire.

In addition, the information-processing apparatus 1 can be not only connected by a public line to an external server or the like, from which application software and data files can be downloaded, but also connected to typically a server system or a terminal in a communication system by a dedicated line.

It should be noted that the configuration of the information-processing apparatus 1 shown in FIG. 2 is typical to the bitter end. That is to say, configurations of the information-processing apparatus 1 are not limited to the one shown in the figure. For example, it is possible to add a variety of configuration members employed generally in a personal computer or a PDA apparatus to the configuration; or eliminate members each serving as a component not actually needed from the configuration on the basis of design considerations.

3: Structures of the OS and the Database

Figure 3:
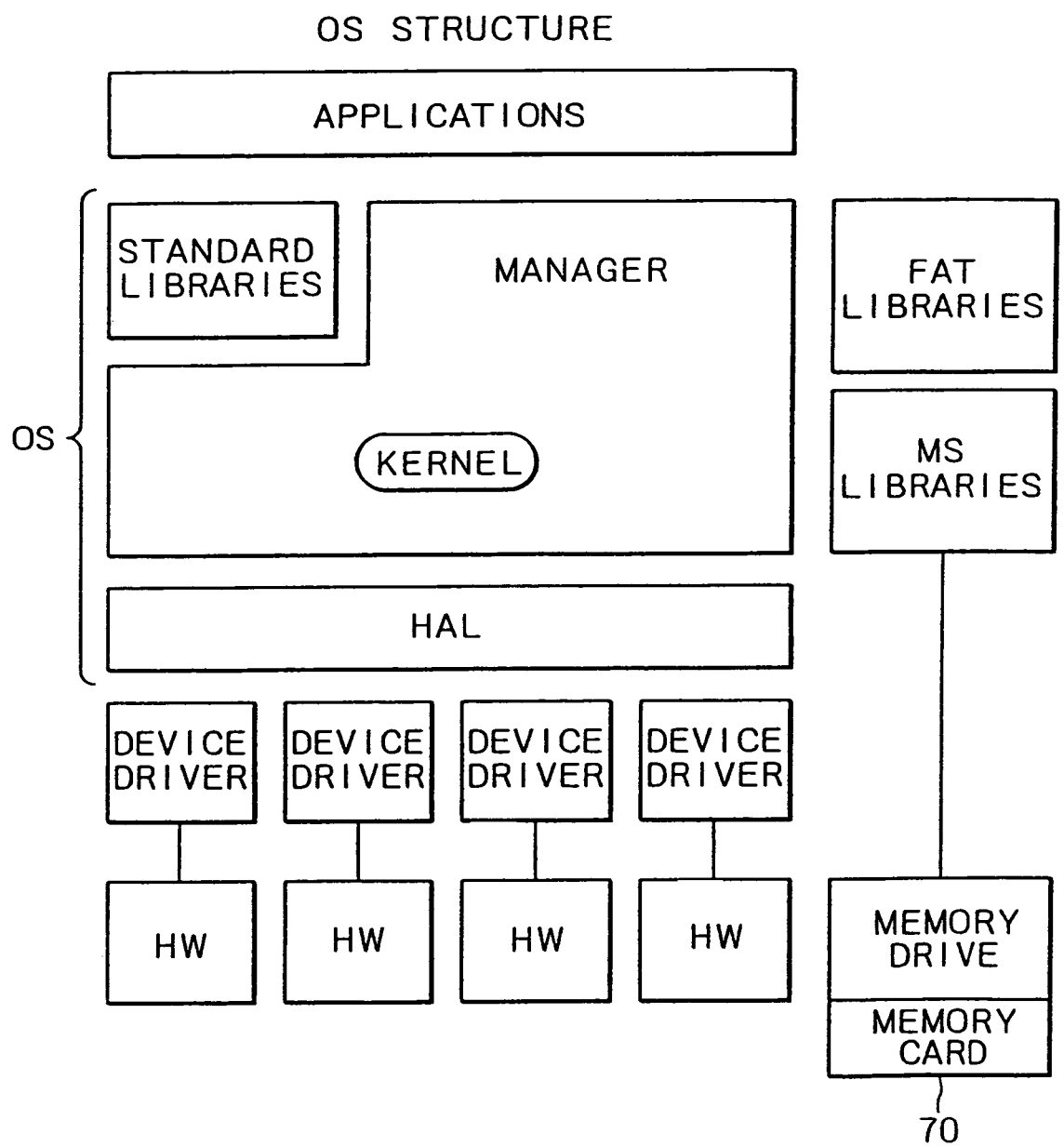
FIG. 3 is an explanatory diagram showing the structure of an OS installed in the information-processing apparatus implemented by the embodiment.

The following description explains the structure of an OS installed in the information-processing apparatus 1 by referring to FIG. 3. As shown in FIG. 3, the OS which is basic software comprises a manager layer including a kernel serving as the nucleus of the OS, standard libraries and an HAL (Hardware Abstract Layer). The HAL is a layer of hardware such as a control IC.

Application software is executed under basic operations of such an OS configuration.

A device driver or a plurality of device drivers are provided for the HAL, forming a layer. Each of the device drivers drives actual hardware (HW) with which the device driver is associated.

Particularly, in the case of the information-processing apparatus 1 implemented by the embodiment, the memory card 70 can be driven by a device driver. Since data stored in the memory card 70 is managed by using a FAT system as will be described later, the OS includes a FAT library. The OS also has an MS library for handling memory cards 70.

Thus, a memory drive and memory cards 70 are driven on the basis of a FAT library, an MS library.

In the information-processing apparatus 1 implemented by the embodiment to have such an OS structure, a database concept is introduced as a concept corresponding to what is normally called a file.

The technical term database used in this description is not what is normally called a database used merely for storing data, but a database with a formatted structure wherein the database itself is capable of managing data. In this meaning, the database corresponds to a file.

Figure 4:
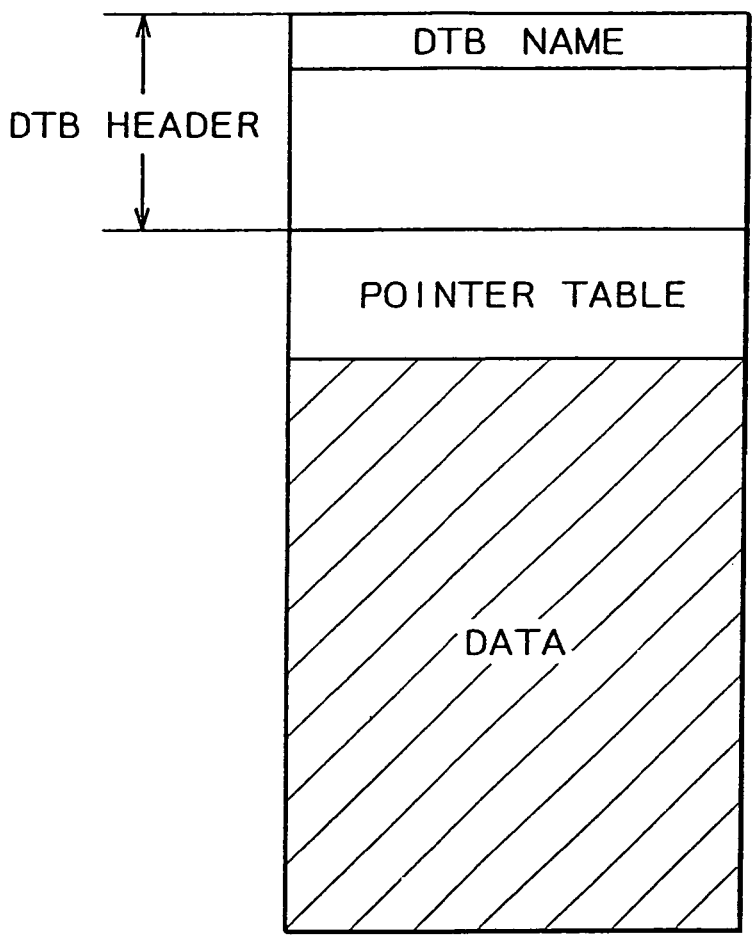
FIG. 4 is an explanatory diagram showing the structure of a database handled in the information-processing apparatus implemented by the embodiment.

FIG. 4 is a diagram showing the structure of a database. As shown in the figure, the database comprises a header (DTB header), a pointer table and a data area for storing actual data. The DTB header includes a database name (DTB name) and an area for storing other information. Locations of pieces of actual data stored in the data area are managed by pointers stored in the pointer table.

There are 2 types of database with such a structure. For example, in general, a piece of application software comprises a plurality of files, namely, an execution file named \*\*\*.exe and a data file named \*\*\*.data. A resource database named \*\*\*.prc corresponds to the execution file \*\*\*.exe and a database named \*\*\*.dtb corresponds to the data file \*\*\*.data.

In the information-processing apparatus 1 implemented by this embodiment, data is handled by adopting such a concept of database. Thus, a file recorded into or played back from a memory card 70 or a file handled by the FAT file system is treated as a database.

It should be noted that the technical term file used in this specification means a file conforming to the general concept. In this embodiment, file means a database with the structure described above.

4: Network Configuration

Figure 5:
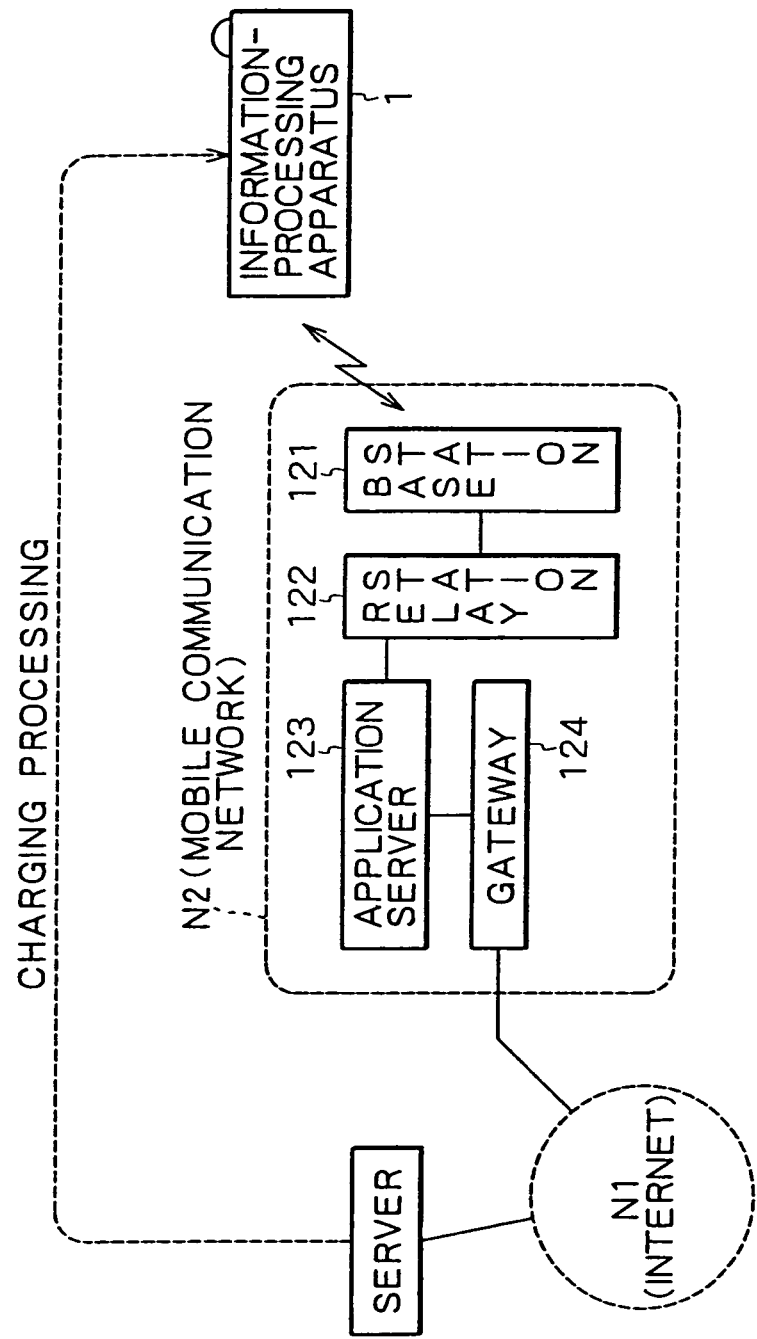
FIG. 5 is a diagram showing a communication network provided by the embodiment.

FIG. 5 is a diagram simply and plainly showing a communication network to which the information-processing apparatus 1 is connected. As described earlier, the information-processing apparatus 1 is capable of loading application programs and the like from a server by communication through the communication unit 36. A server 130 connected to a communication network like the one shown in FIG. 5 is a server from which application programs can be loaded.

FIG. 5 is a diagram showing a model of a communication network implemented for a portable-telephone system or the like. A mobile-communication network N2 is a communication network provided by a communication enterprise generally known as a provider. As shown in the figure, the mobile-communication network N2 comprises a base station 121, a relay station 122, an application server 123 and a gateway 124.

The information-processing apparatus 1 implemented by the embodiment establishes radio communication with the base station 121 employed in the mobile-communication network N2. It should be noted that there are of course a plurality of base stations 121 and a plurality of relay stations 122.

The application server 123 is a member for providing application software and data files to the information-processing apparatus 1 and other terminals. The gateway 124 functions as a conversion unit for handling data of typically homepages in Internet N1. Thus, the application server 123 is capable of communicating with Internet N1 through the gateway 124. Information acquired from Internet N1 through such communication can be transmitted to a terminal of such as the information-processing apparatus 1.

The server 130 rendering downloading services to the information-processing apparatus 1 in this embodiment is a server connected to Internet N1. The server 130 renders services of downloading application programs to the information-processing apparatus 1 by communication through the mobile-communication network N2.

It should be noted that the services rendered by the server 130 to download application programs to the information-processing apparatus 1 can be free of charge. In the case of fee-charging services, on the other hand, the server 130 carries out a charging process for the user of the information-processing apparatus 1 each time a service is rendered.

5: Server

Figure 6:
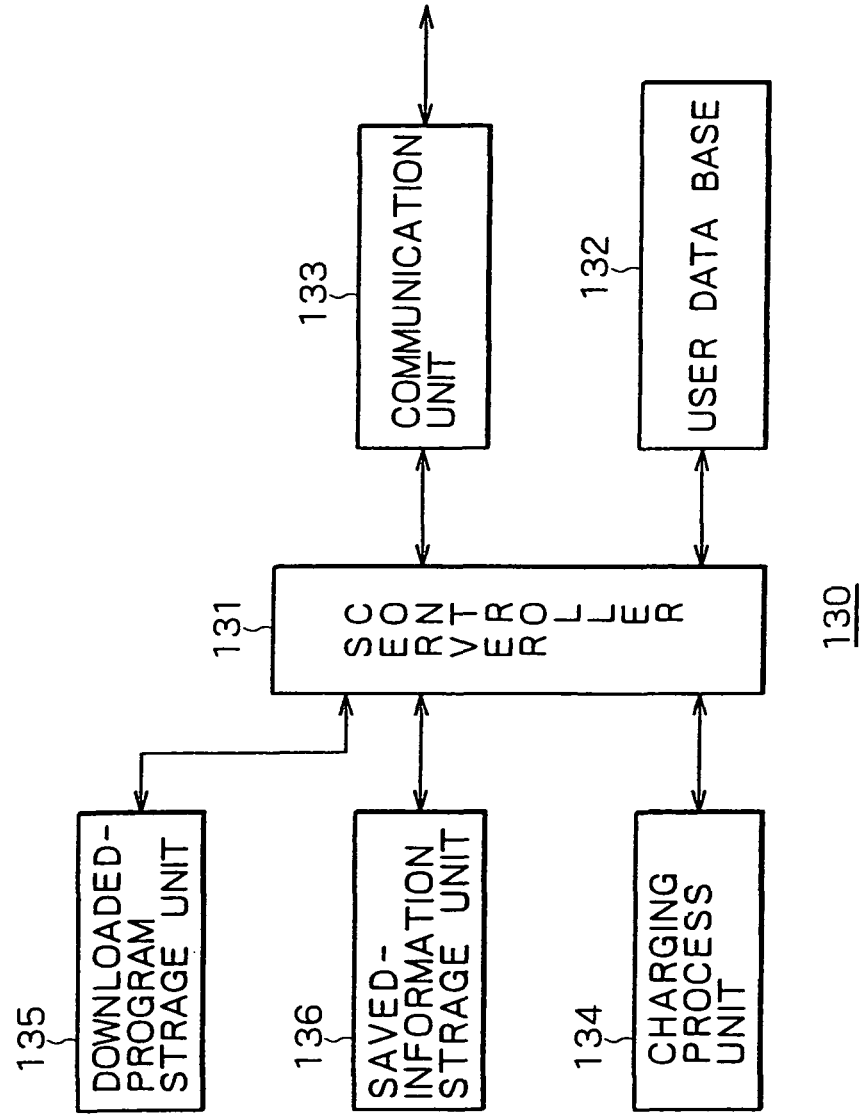
FIG. 6 is a block diagram showing a server provided by the embodiment.

FIG. 6 is a diagram showing the configuration of the server 130. As shown in the figure, the server 130 comprises a server controller 131, a user data base 132, a communication unit 133, a charging process unit 134, a downloaded-program storage unit 135 and a saved-information storage unit 136.

The server controller 131 is a member for controlling server components for rendering services to download application programs to the information-processing apparatus 1. An actual downloading process will be explained later by referring to FIGS. 12 and 13. In addition, the server controller 131 also executes various kinds of management such as management/cataloging of users, management of application programs to be downloaded and management of a charging process for each of the users.

The user data base 132 is a member for storing data of users registered as recipients of services rendered by the server 130 to download programs to the information-processing apparatuses 1.

Data of a user includes the name of the user, the age of the user, the birthday of the user, the gender of the user, the address and the occupation of the user, the telephone number of the user, the fax number of the user, the email address of the user, charging information of the user, the password of the user, the log-in ID of the user and the equipment serial ID assigned to the information-processing apparatus 1 used by the user.

The charging information is information for collecting a fee from the user. Examples of such information are the number of a bank account assigned to the user and the number of a credit card issued to the user.

The password is typically a registered code determined by the user arbitrarily or a unique code assigned by the server 130 to each user. The password is used for authenticating the user before a requested application program is downloaded as will be described later.

When a communication with an information-processing apparatus 1 is established, the server controller 131 refers to information stored in the user data base 132 to authenticate the user of the information-processing apparatus 1. The server controller 131 is also capable of carrying out a necessary charging process for the user.

The communication unit 133 is a member for communicating data with the information-processing apparatus 1 by way of communication networks such as Internet N1 and the mobile communication network N2 which are shown in FIG. 5.

The charging process unit 134 is a member for carrying out a charging process for the user receiving a service in accordance with a command issued by the server controller 131. An example of the charging process is computer processing to find a total of money which each user must pay or to execute a procedure to withdraw money from a bank account.

The downloaded-program storage unit 135 is a member for storing a variety of application programs to be downloaded to the information-processing apparatus 1 and data files relevant to the programs. Application programs that can be downloaded are conceivably application programs generally available in the market for sales, version-up programs, additional data, a new software product serving as a prototype version, software files and many other kinds of software.

The saved-information storage unit 136 is a storage member which is used for saving data from the D-RAM 24 employed in the information-processing apparatus 1 in accordance with a request made by the information-processing apparatus 1 in case the D-RAM 24 does not have a sufficient free area for installing a new application program. For example, a storage area of 10 Mbyte is allocated in the saved-information storage unit 136 to each registered user.

It should be noted that, while the downloaded-program storage unit 135 and the saved-information storage unit 136 provided internally in the server 130 as shown in FIG. 6 are typically a hard-disc drive or another storage unit that has a large capacity and can be implemented in a recording/playback apparatus, the downloaded-program storage unit 135 and the saved-information storage unit 136 can each also be a unit external to the server 130. For example, the downloaded-program storage unit 135 and the saved-information storage unit 136 are connected by Internet N1 or a dedicated line to the server 130 in such a way that the server 130 is capable of managing the downloaded-program storage unit 135 and the saved-information storage unit 136. As an alternative, the downloaded-program storage unit 135 and the saved-information storage unit 136 are different storage areas in the same recording medium employed in a recording/playback apparatus.

6: Processing to Download an Application Program from the Server to the Information-Processing Apparatus Much like an ordinary PC, the user of the information-processing apparatus 1 obtains required application software and installs the software in the information-processing apparatus 1 so as to carry out a desired information-processing operation based on the application software.

In particular, each user is registered in the server 130 described above as a recipient of services rendered by the server 130. To be more specific, data of each user is stored in the user data base 132 employed in the server 130. The server 130 authenticates a user by referring to the user data base 132 before downloading an application program desired by the user to an information-processing apparatus 1 used by the user to be installed in a D-RAM 24 for use by the user.

In the following description, processing to download an application program is explained.

First of all, a characteristic operation of this embodiment is described in a simple and plain manner as follows. An application program to be activated by the information-processing apparatus 1 must be stored in the D-RAM 24. When the user activates an application program or switches the software from an application program to another, the OS functioning as basic software in the CPU 22 invokes the application program and increments the contents of a counter assigned to the newly activated application program. The counter is included in an activation-history table provided for all application programs. The activation-history table is stored in a non-volatile area of the D-RAM 24. It should be noted that the activation-history table needs to be preserved in the D-RAM 24 even if the power supply of the information-processing apparatus 1 is turned off. That is why the activation-history table is stored in a non-volatile area of the D-RAM 24.

The activation-history table has a typical configuration like one shown in FIG. 7. As is obvious from the figure, the number of application programs stored in the D-RAM 24, that is, the number of table entries, is determined by the size of the activation-history table. Provided for each application program, a table entry includes an application-program ID, an application name, an activation count, a save flag, a temporary attribute and an address.

The activation count represents the number of times the application program has been activated. The save flag indicates whether or not the application program has been saved in the saved-information storage unit 136 employed in the server 130 in processing described later. The temporary attribute is a flag indicating whether or not the application program is a program temporarily installed in the D-RAM 24 from the downloaded-program storage unit 135 employed in the server 130. The address indicates a location in the D-RAM 24 at which the application program is stored.

The activation count is the counter's contents which are incremented when the application program is activated as described above.

When a communication is established between the information-processing apparatus 1 and the server 130 and the user carries out an operation to download a desired application program, the server 130 transmits the requested application program and a data file relevant to the program to the information-processing apparatus 1 and the CPU 22 stores the application program and the relevant data in the D-RAM 24.

If the size of a remaining storage area in the D-RAM 24 is smaller than the size of a program or the amount of data to be loaded from the server 130, however, the program or the data cannot be newly installed unless an empty area is newly allocated in the D-RAM 24.

In order to solve this problem, in this embodiment, the OS saves application programs and/or data files already loaded in the D-RAM 24 to an empty area in the saved-information storage unit 136 employed in the server 130. The application programs and the data files to be saved are selected by referring to an activation-history table. To be more specific, the OS saves the selected application programs and the data files thereof sequentially one program after another to the saved-information storage unit 136, starting with that used least frequently by the user as indicated by a smallest activation count in the activation-history table until a free storage area large enough for accommodating a program or data to be newly downloaded from the downloaded-program storage unit 135 employed in the server 130 is allocated in the D-RAM 24.

After application programs and the data files thereof stored in the D-RAM 24 are saved into the saved-information storage unit 136 in the order of increasing activation frequencies or increasing activation counts as described above, a free storage area allowing an application program and/or data to be newly installed is allocated in the D-RAM 24. Then, the OS requests the server 130 to download the desired application program and a data file thereof, expanding the downloaded application program and the downloaded data file into the D-RAM 24. The OS also adds an application-program ID, an application name, an activation count, a save flag, a temporary attribute and an address as an entry for the downloaded application program to the activation-history table. The OS sets the activation count as well as the temporary attribute at 1 and then puts the application program in an activatable state.

When the use of a downloaded application program is finished, the program is deleted from the D-RAM 24 so that a free storage area is created in the D-RAM 24. An application program saved from the D-RAM 24 to the saved-information storage unit 136 is then restored back to the free area created in the D-RAM 24.

To put it in detail, an application program downloaded from the server 130 has a temporary attribute set at 1 in the activation-history table. Thus, such an application program is deleted from the D-RAM 24 or moved to another memory so that the application program no longer exists in the D-RAM 24.

Then, the information-processing apparatus 1 requests the server 130 to transmit the application program and the data file which have been saved in the saved-information storage unit 136, storing the program and the file into the D-RAM 24. That is to say, a state prior to the downloading is restored. At that time, the save flag of the application program is reset to 0 in the application-history table.

It should be noted that the use of a downloaded application program can be finished in a variety of possible circumstances described as follows.

For example, the server 130 presents an application program to the user on a renting basis allowing the program to be used only once. Thus, at the end of execution of the application program, the use of the program is considered to be finished and a saved application program as well a saved data file can be restored back to the D-RAM 24.

As an alternative, even if an application program is presented to the user on such a renting basis, the use of the program may not be considered to be finished till the user carries out an operation indicating the user's intention to return the program to the server 130.

In addition, in the case of an application program purchased by the user from the server 130, the use of the program may be considered to be finished when the user transfers the application program installed in the D-RAM 24 to a memory card 70.

Figure 8:
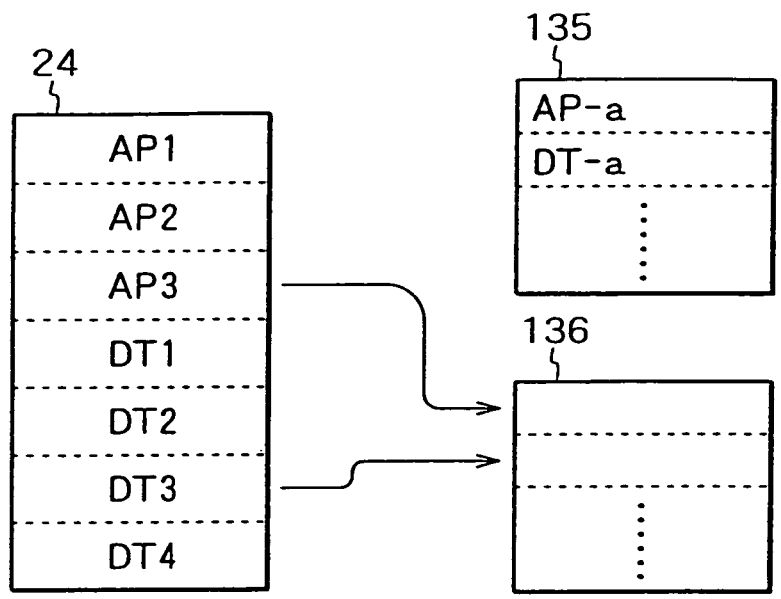
FIG. 8 is an explanatory diagram showing how an application program is downloaded and saved in this embodiment.
Figure 9:
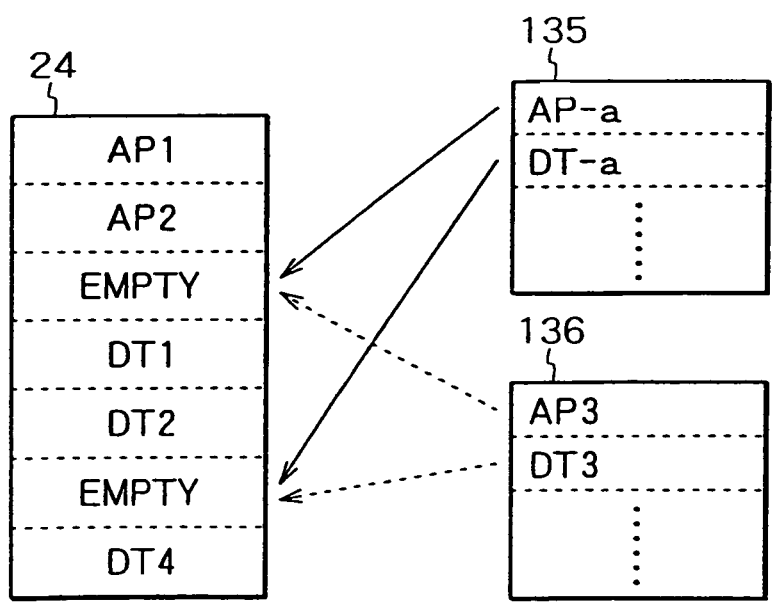
FIG. 9 is an explanatory diagram showing how an application program is downloaded and saved in this embodiment.
Figure 10:
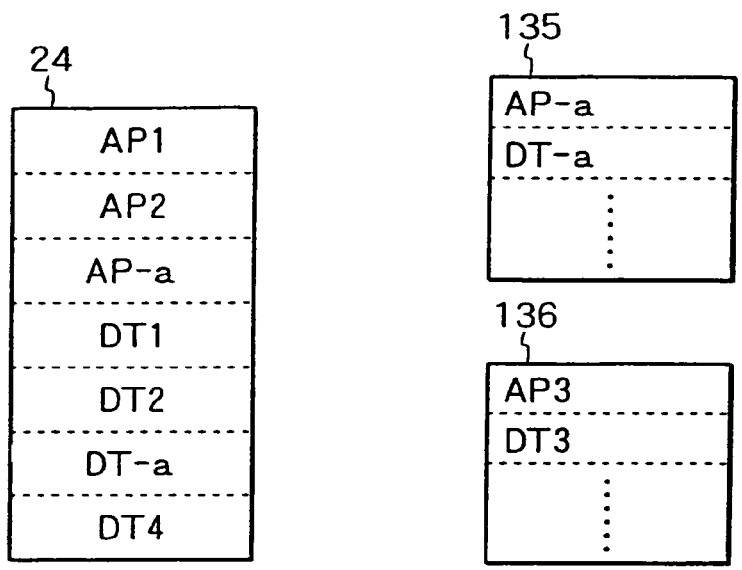
FIG. 10 is an explanatory diagram showing how an application program is downloaded and saved in this embodiment.

The above processing is further explained by referring to models shown in FIGS. 8, 9 and 10. First of all, assume that the D-RAM 24 is being used all but fully for storing application programs AP1, AP2 and AP3 as well as data files DT1, DT2, DT3 and DT4 as shown in FIG. 8. At that time, let the user make a request to download an application program AP-a and a data file DT-a relevant to the application program AP-a from the server 130.

In this case, the OS executed by the CPU 22 makes an attempt to download and to install the application program AP-a as well as the data file DT-a from the server 130 into the D-RAM 24. In the D-RAM 24, however, there is no enough free storage area left.

In order to solve this problem, the OS selectively saves application programs sequentially one program after another to the saved-information storage unit 136, starting with that used least frequently by the user by referring to the application-history table. Assume that the application program AP3 has been used least frequently by the user. In this case, the OS transmits the application program AP3 and the related data file DT3 thereof to the server 130 to be saved in the saved-information storage unit 136 as indicated by solid-line arrows in FIG. 8.

The application program AP3 and the data file DT3 thereof are saved in the saved-information storage unit 136. As a result, since empty areas are created in the D-RAM 24 as shown in FIG. 9, the application program AP-a and the data file DT-a thereof can be downloaded from the downloaded-program storage unit 135 and installed into the free storage areas in the D-RAM 24 as indicated by solid-line arrows in the figure. FIG. 10 is a diagram showing the states of the D-RAM 24, the downloaded-program storage unit 135 and the saved-information storage unit 136. The states are obtained after the application program AP-a and the data file DT-a thereof are installed into the free storage areas.

After the application program AP-a and the data file DT-a thereof are installed from the downloaded-program storage unit 135 into the free storage areas of the D-RAM 24, the CPU 22 activates the application program AP-a.

When the use of the downloaded application program AP-a and the downloaded data file DT-a is finished, on the other hand, the application program AP-a and the data file DT-a thereof are first of all deleted from the D-RAM 24 shown in FIG. 10 or transferred from the D-RAM 24 to the memory card 70 or the like to create free areas in the D-RAM 24 as shown in FIG. 9. Then, a request is made to transmit the application program AP3 and the data file DT3 thereof from the saved-information storage unit 136 employed in the server 130 to the information-processing apparatus 1 to be stored back in the free storage areas in the D-RAM 24 as indicated by dashed-line arrows in FIG. 9 to restore the states shown in FIG. 8. The states of the D-RAM 24 and the memory card 70, which are shown in FIG. 8, are the states prior to the downloading.

Figure 11:
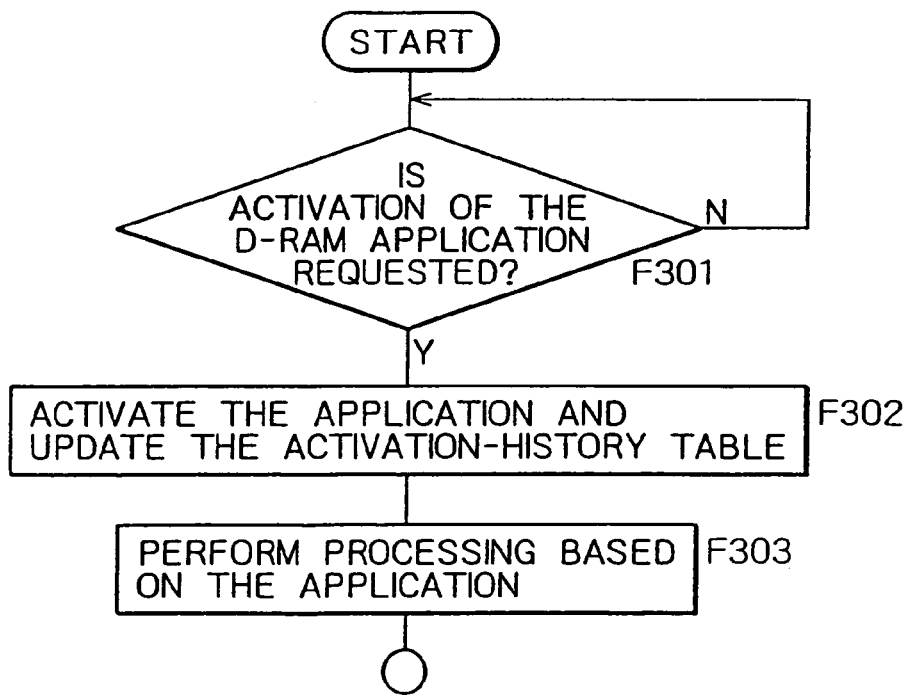
FIG. 11 shows a flowchart representing processing carried out upon activation of an application program.
Figure 12:
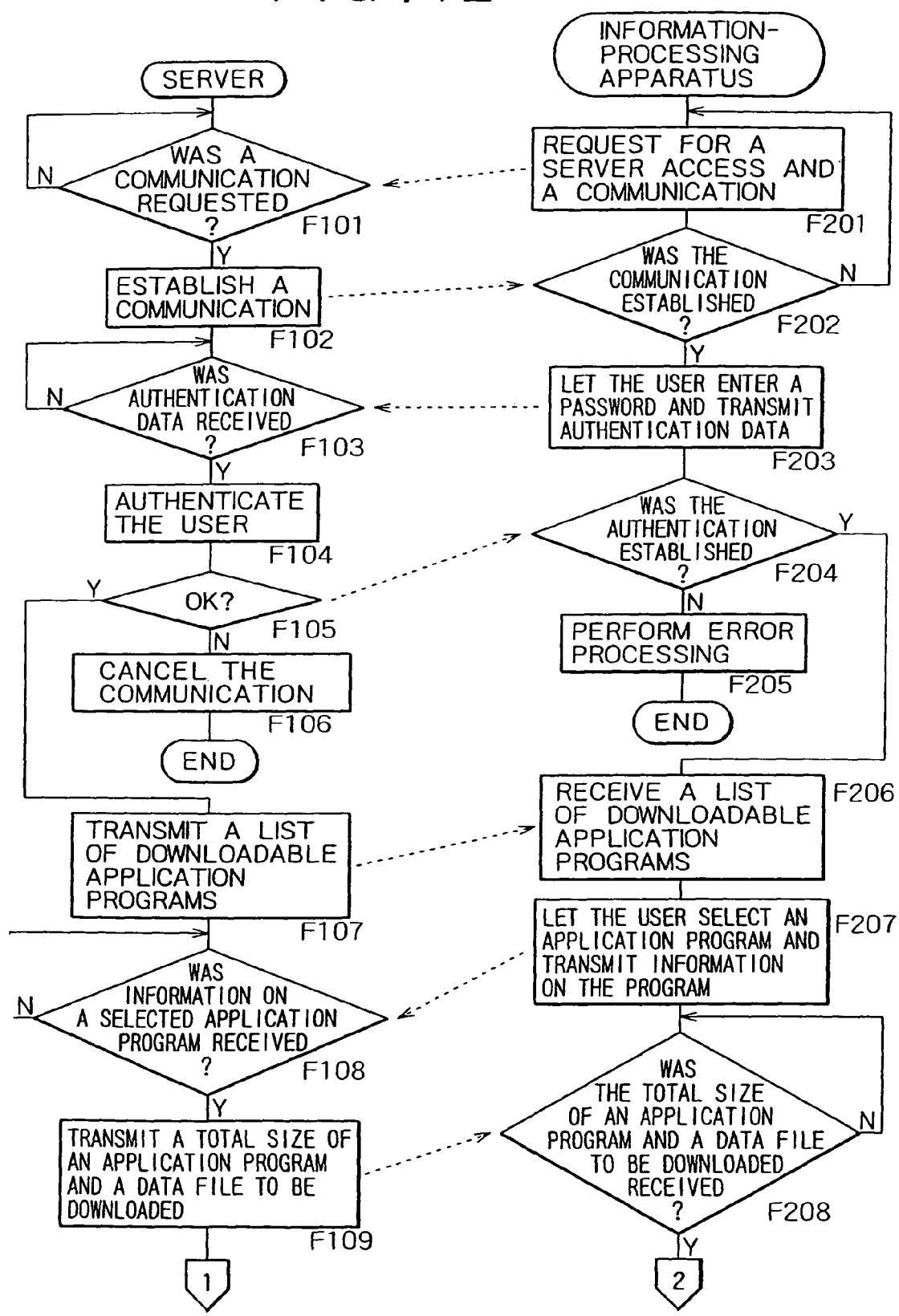
FIG. 12 is flowcharts representing processing to download an application program in this embodiment.
Figure 13:
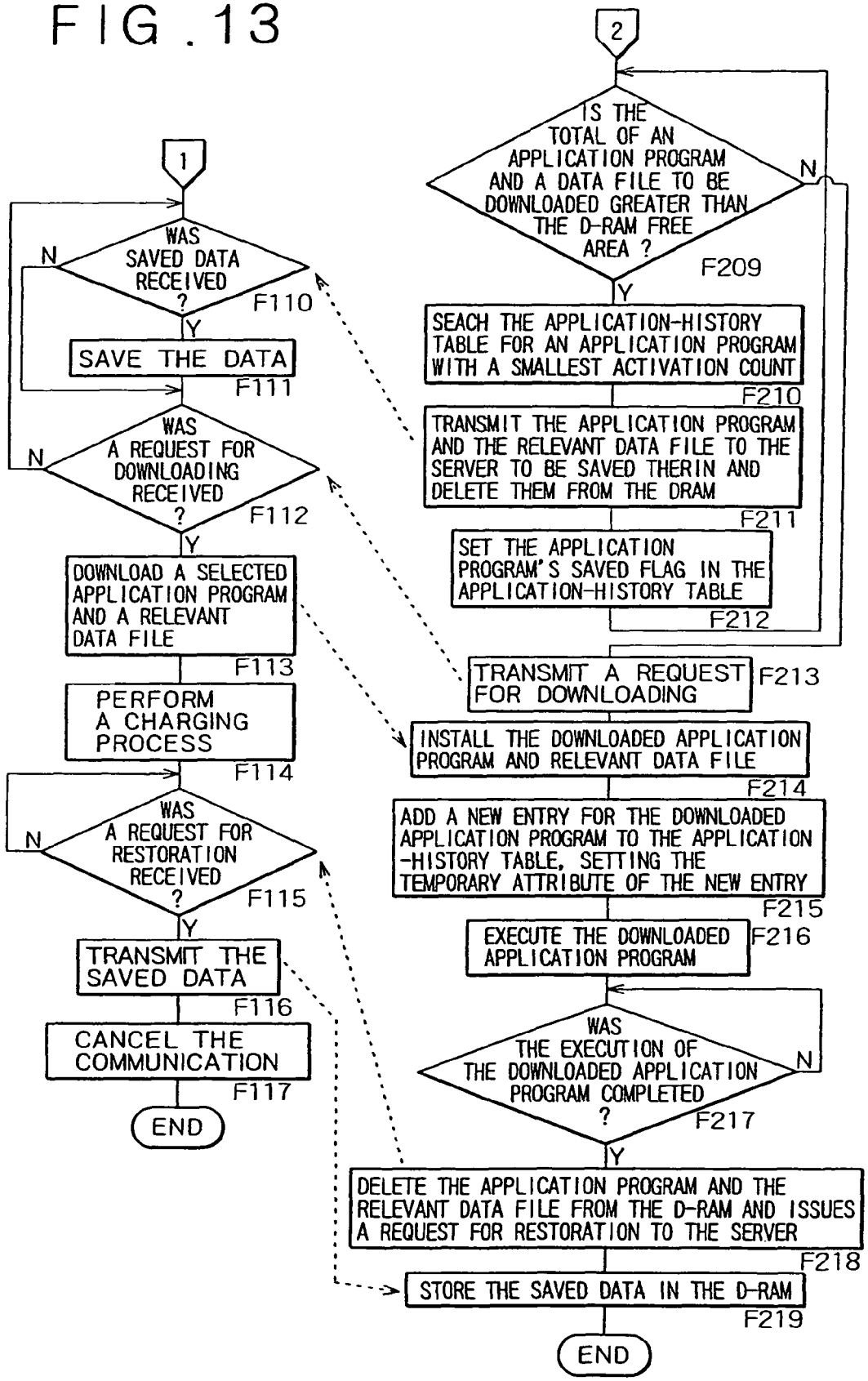
FIG. 13 is continuation flowcharts representing processing to download an application program in this embodiment.

Pieces of processing carried out by the CPU 22 and the server 130 as described above are explained by referring to flowcharts shown in FIGS. 11, 12 and 13.

First of all, FIG. 11 shows a flowchart representing processing carried out at activation of an application program stored in the D-RAM 24 and not downloaded from the server 130.

As shown in FIG. 11, the flowchart begins with a step F301 to form a judgment as to whether or not a command to activate a certain application program stored in the D-RAM 24 has been issued typically by an operation carried out by the user. If such a command has been issued, the flow of the processing goes on to a step F302 at which the CPU 22 activates the application program and updates the activation-history table. To put it in detail, the CPU 22 increments the activation-history table's activation count assigned to the application program.

At the next step F303, the CPU 22 executes the application program to carry out processing based on the program.

As described above, the activation-history table is updated at activation of an application program. In this way, the CPU 22 is capable of always knowing an activation history of each application program stored in the D-RAM 24.

On the other hand, FIGS. 12 and 13 show flowcharts representing processing carried out to download an application program from the server 130. To be more specific, FIGS. 12 and 13 show flowcharts representing processing carried out by the server controller 131 employed in the server 130 and a flowchart representing processing carried out by the CPU 22 employed in the information-processing apparatus 1 in parallel to the processing performed by the server controller 131.

As shown FIG. 12, the processing carried out by the CPU 22 begins with a step F201 at which the user carries out an operation to establish a connection between the information-processing apparatus 1 and the server 130 through a communication line in an attempt to download a desired application program from the server 130. In accordance with such an operation, the CPU 22 makes an access to the server 130 through the communication unit 36 to make a request for establishment of a communication with the server 130 through the communication line.

In the mean time, the processing carried out by the server 130 starts with a step F101 at which the server controller 131 forms a judgment as to whether or not a request for establishment of a communication has been received from the information-processing apparatus 1. If a request for establishment of a communication has been received from the information-processing apparatus 1, the flow of the processing goes on to a step F102 at which a communication is established through the communication line to allow the server 130 and the information-processing apparatus 1 to exchange data with each other.

The flow of the processing carried out by the CPU 22 goes on to a step F202 to form a judgment as to whether or not a communication has been established. If a communication has been established, the flow of the processing goes on to a step F203 at which the user is requested to enter a password. Then, the CPU 22 transmits authentication data including the password to the server 130. In addition to the password, the authentication data includes the serial ID of the information-processing apparatus 1 and the log-in ID. The authentication data is information for the server 130 authenticating the user.

The pieces of information included in the authentication data and the password are cataloged in advance by the user in the user data base 132 employed in the server 130. At a step F103, the server controller 131 forms a judgment as to whether the authentication data has been received from the information-processing apparatus 1. If the authentication data has been received from the information-processing apparatus 1, the flow of the processing goes on to a step F104 at which the user data base 132 is searched for data associated with the password received from the information-processing apparatus 1 in order to authenticate the user.

The flow of the processing then goes on to a step F105 to form a judgment as to whether or not the result of authentication is OK. If the result of the authentication is NG, the flow of the processing goes on to a step F106 at which the communication with the information-processing apparatus 1 is ended. At that time, the NG result of the authentication is transmitted to the information-processing apparatus 1.

The flow of the processing carried out by the CPU 22 goes on to a step F204 to form a judgment as to whether or not the result of authentication is OK. Since the result of the authentication is NG in this case, the flow of the processing goes on to a step F205 at which error processing is carried out before the processing carried out by the CPU 22 is ended. Typically, the user is informed of the NG result of authentication and an unapproved loading service. The processing carried out by the CPU 22 is then terminated.

If the outcome of the judgment formed at the step F105 indicates that the result of the authentication is OK, on the other hand, the flow of the processing carried out by the server controller 131 goes on to a step F107 at which a list of application programs that can be downloaded and presented to the information-processing apparatus 1 is transmitted to the information-processing apparatus 1. The application programs that can be downloaded and presented to the information-processing apparatus 1 are application programs stored in the downloaded-program storage unit 135. At that time, the OK result of the authentication is also transmitted to the information-processing apparatus 1.

Since the outcome of the judgment formed at the step F204 indicates that the result of the authentication is OK in this case, the flow of the processing carried out by the CPU 22 goes on to a step F206 at which the list of application programs is received. At the next step F207, the list of application programs is displayed on the display unit 2 to the user. The information-processing apparatus 1 requests the user to select a desired application program from the list, that is, an application program to be downloaded. The user then carries out an operation to select a desired application program from the list. As the operation to select a desired application program is completed, the CPU 22 transmits data representing the selected application program to the server 130.

In the mean time, the flow of the processing carried out by the server controller 131 goes on to a step F108 to form a judgment as to whether or not the data representing the selected application program has been received from the information-processing apparatus 1. If the data representing the selected application program has been received from the information-processing apparatus 1, the flow of the processing goes on to a step F109 at which a total size of the selected application program to be downloaded and a data file relevant to the program is transmitted to the information-processing apparatus 1. The total size is the size of a storage area in the D-RAM 24 required for accommodating the requested application program and the relevant data file, which are to be downloaded from the server 130 to the information-processing apparatus 1.

At the next step F110 of the flowchart shown in FIG. 13, the server controller 131 forms a judgment as to whether or not saved data has been received from the information-processing apparatus 1. At a step F112, the server controller 131 forms a judgment as to whether or not a request for downloading has been received from the information-processing apparatus 1.

In the mean time, the flow of the processing carried out by the CPU 22 goes on to a step F208 of the flowchart shown in FIG. 12 to form a judgment as to whether or not the total size of the selected application program to be downloaded and a data file relevant to the program has been received from the server 130. If the total size of downloading has been received from the server 130, the flow of the processing goes on to a step F209 of the flowchart shown in FIG. 13 to compare the total size of the selected application program to be downloaded and a data file relevant to the program with the storage size of a free area in the D-RAM 24.

If a free area with a storage size at least equal to the total size of the selected application program to be downloaded and a data file relevant to the program exists in the D-RAM 24, that is, if the remaining area is large enough for installing the application program and the relevant data file to be downloaded, the flow of the processing goes on to a step F213 at which the information-processing apparatus 1 requests the server 130 to down load the program and the file.

In this case, the outcome of the judgment formed at the step F112 of the processing carried out by the server 130 indicates that a request for downloading has been received from the information-processing apparatus 1, causing the server controller 131 to continue the processing to a step F113. At the step F113, an application program and a relevant data file which are selected from those stored in the downloaded-program storage unit 135 are retrieved and transmitted to the information-processing apparatus 1. The application program and the relevant data file are then downloaded to the information-processing apparatus 1.

In the mean time, the processing carried out by the CPU 22 goes on to a step F214 at which the application program and the relevant data file are installed in the D-RAM 24. Then, at the next step F215, a new entry for the newly installed application program is added to the application-history table. The activation count and the temporary attribute in the new entry are both set at 1. At the next step F216, the application program is activated and processing based on the application program is carried out.

Since the application program downloaded by the server controller 131 at the step F113 is a copy rented or sold to the user, at the next step F114, the charging process unit 134 carries out a charging process for determining a fee to be charged to the user.

If the outcome of the judgment formed at the step F209 indicates that a free area with a storage size at least equal to the total size of the selected application program to be downloaded and a data file relevant to the program does not exist in the D-RAM 24, that is, if the remaining area is not large enough for installing the application program and the relevant data file to be downloaded, on the other hand, the flow of the processing goes on to a step F210 at which the CPU 22 searches the activation-history table for an application program with a smallest activation count. At the next step F211, the application program with a smallest activation count is transmitted to the server 130 to be saved therein, and deleted from the D-RAM 24 to create a free storage area. At the next step F212, the save flag for the saved application program in the activation-history table is set.

The flow of the processing then goes back to the step F209 at which the CPU 22 finds a new total size of free storage areas in the D-RAM 24 and compares the new total size with the total size of an application program and a relevant data file, which are to be downloaded from the server 130.

If the total size of an application program and a data file relevant thereto is found not greater than the total size of free storage areas in the D-RAM 24, the flow of the processing goes on to a step F213 to repeat the same pieces of processing of the step F210 and the subsequent steps. If the total size of an application program and a data file relevant thereto is found greater than the total size of free storage areas in the D-RAM 24, on the other hand, the flow of the processing goes on to the step F210 at which pieces of processing of the step. F210 and the subsequent steps are carried out again. That is to say, the CPU 22 searches the activation-history table for an application program with a smallest activation count, saves the application program from the D-RAM 24 to the server 130 and updates the activation-history table before going back to the step F209.

It should be noted that, at the step F210, the activation-history table is of course searched for an application program with a smallest activation count among application programs each having a reset save flag.

After the CPU 22 of the information-processing apparatus 1 transmits an application program and a data file to the server 130 at the step F211 to be saved therein as described above, the outcome of the judgment formed by the server controller 131 employed in the server 130 at the step F110 indicates that saved data has been received, causing the flow of the processing carried out by the server 130 to go on to a step F111 at which the received application program and the received data file are saved in the saved-information storage unit 136.

As described above, in case the D-RAM 24 does not contain a free area with a storage size large enough for accommodating a desired application program and a data file relevant thereto to be downloaded from the downloaded-program storage unit 135 to the D-RAM 24, in the pieces of processing carried out by the CPU 22 at the steps F209 to F212 and in the pieces of processing carried out by the server controller 131 at the steps F110 and F111, the CPU 22 repeatedly transfers application programs and data files relevant thereto from the D-RAM 24 to the saved-information storage unit 136 one program after another, starting with an application program having a smallest activation count till such a free area gets allocated in the D-RAM 24.

At a time the storage size of such a free area becomes large enough for accommodating a desired application program and a data file relevant thereto to be downloaded from the downloaded-program storage unit 135 to the D-RAM 24, the flow of the processing carried out by the CPU 22 goes on to the step F213 and the subsequent steps at which the CPU 22 makes a request for downloading of the desired application program. At this request, the server controller 131 downloads the desired application program and the relevant data file at the step F113 and carries out a charging process after the downloading. The CPU 22 then installs the downloaded application program and the downloaded data file, updates the application-history table to include a new table entry for the downloaded application program and activates the installed application program.

It should be noted that the charging process carried out by the server controller 131 at the step F114 may include charging for a fee of storing saved application programs and saved data files in case such application programs and such data files have been saved in the saved-information storage unit 136.

In addition, the fee of storing saved application programs and saved data files normally depends on the length of a storage time even though the length is not known at the time the charging process is carried out at the step F114.

By virtue of the processing described above, the user is capable of obtaining a desired application program from the server 130 without the need to worry about a free storage area left in the D-RAM 24 and the need to carry out an operation to delete or save an application program already existing in the D-RAM 24.

The user is capable of using a desired application program downloaded from the server 130 in any arbitrary way. At the end of the use of the desired application program, application programs and data files which have been saved in the saved-information storage unit 136 are restored to the D-RAM 24.

It should be noted that, as described above, the use of a downloaded application program is ended in accordance with a variety of possible conditions such as the form of the service rendered by the server 130 and a contract made by the provider with the user.

The flow of the processing carried out by the CPU 22 then goes on from the step F216 to a step F217 to form a judgment as to whether or not the use of the downloaded application program has been ended. If the use of the downloaded application program has been ended, the processing goes on to a step F218 at which the application program identified by a set temporary attribute thereof and a data file relevant to the program are put in a state of being deleted from the D-RAM 24. A set the temporary attribute of an application program indicates that the application program has been downloaded from the server 130. Such an application program and a data file relevant thereto are put in a state of being deleted from the D-RAM 24 by typically being transferred to the memory card 70 or merely being erased from the D-RAM 24 to create a free storage area in the D-RAM 24. Then, the CPU 22 issues a request to the server 130 to restore saved data.

In the mean time, the processing carried out by the server controller 131 goes on to a step F115 to form a judgment as to whether or not a request for restoration of saved data has been received from the information-processing apparatus 1. If a request for restoration of saved data has been received from the information-processing apparatus 1, the flow of the processing goes on to a step F116 at which the saved data is retrieved from the saved-information storage unit 136 and transmitted to the information-processing apparatus 1. After the saved data is transmitted to the information-processing apparatus 1, the flow of the processing goes on to a step F117 at which the communication is canceled before the processing is ended.

At a step F219, the CPU 22 receives the saved data and stores the data back to the D-RAM 24 before terminating the processing. It should be noted that, as the saved application program is restored to the D-RAM 24, the program's saved flag in the application-history table is cleared.

By carrying out the restoration processing, the D-RAM 24 is put back to a state prior to the downloading.

The processing described above provides an effect of implementation of extremely user-friendly and stressless operations that allow the user to use any arbitrary application program presented by the server 130 without worrying about a memory resource available in the D-RAM 24.

In addition, since the D-RAM 24 is restored to a state prior to downloading, saved application programs can be again used without a problem.

Furthermore, since the application-history table is updated each time an application program is activated, an application program with a smallest activation count can be selected as a program to be transferred from the D-RAM 24 and saved. An application program with a smallest activation count is least likely activated during the use of a downloaded application program. As a result, it is possible to offer an environment most suitable for the user.

The flowcharts shown in FIG. 13 indicate that the server 130 executes the steps F114 and F115 consecutively while the CPU 22 executes the steps F216 and F217 also consecutively. It should be noted, however, that during the executions, the communication is actually canceled and reestablished after authentication in many cases.

Assume for example that an application program downloaded from the server 130 is a temporary rented copy. In this case, the application program is used only during a short period of time and, in order to restore the application program to the D-RAM 24, the processing represented by the flowcharts shown in FIG. 13 can be carried out as it is. In actuality, however, it is convenient in many cases to cancel the communication once upon completion of the downloading of an application program. That is to say, since it is impossible to estimate the length of the time during which an application program downloaded by the user is used, it is undesirable to keep a PDA apparatus in a state of communicating with the server 130 for a long time.

If the communication between the server 130 and the information-processing apparatus 1 is canceled once upon completion of the downloading of an application program, the communication is reestablished upon completion of the use of the application program by carrying out authentication so that saved data can be restored to the D-RAM 24.

Figure 14:
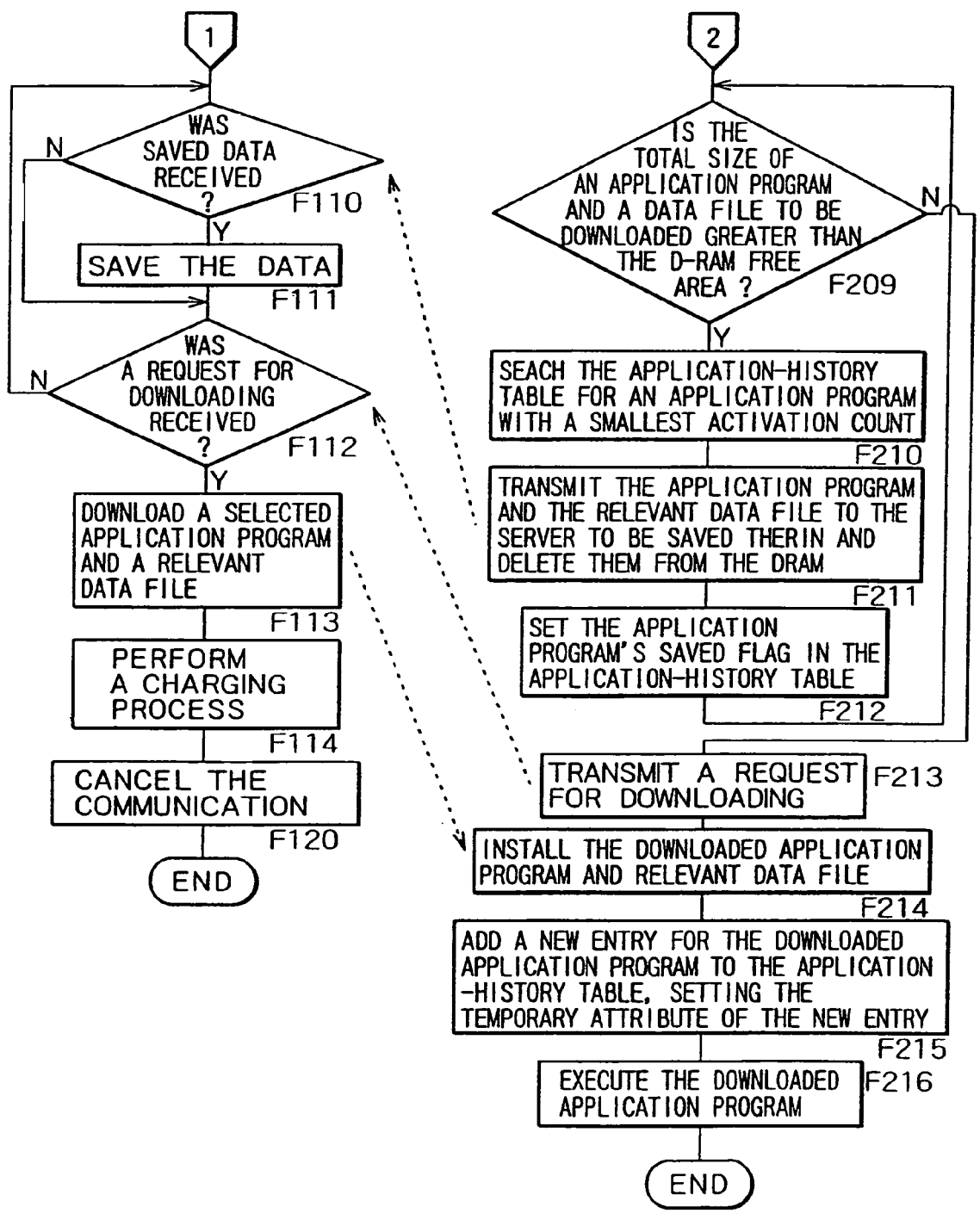
FIG. 14 is flowcharts representing processing to download an application program in another embodiment.
Figure 15:
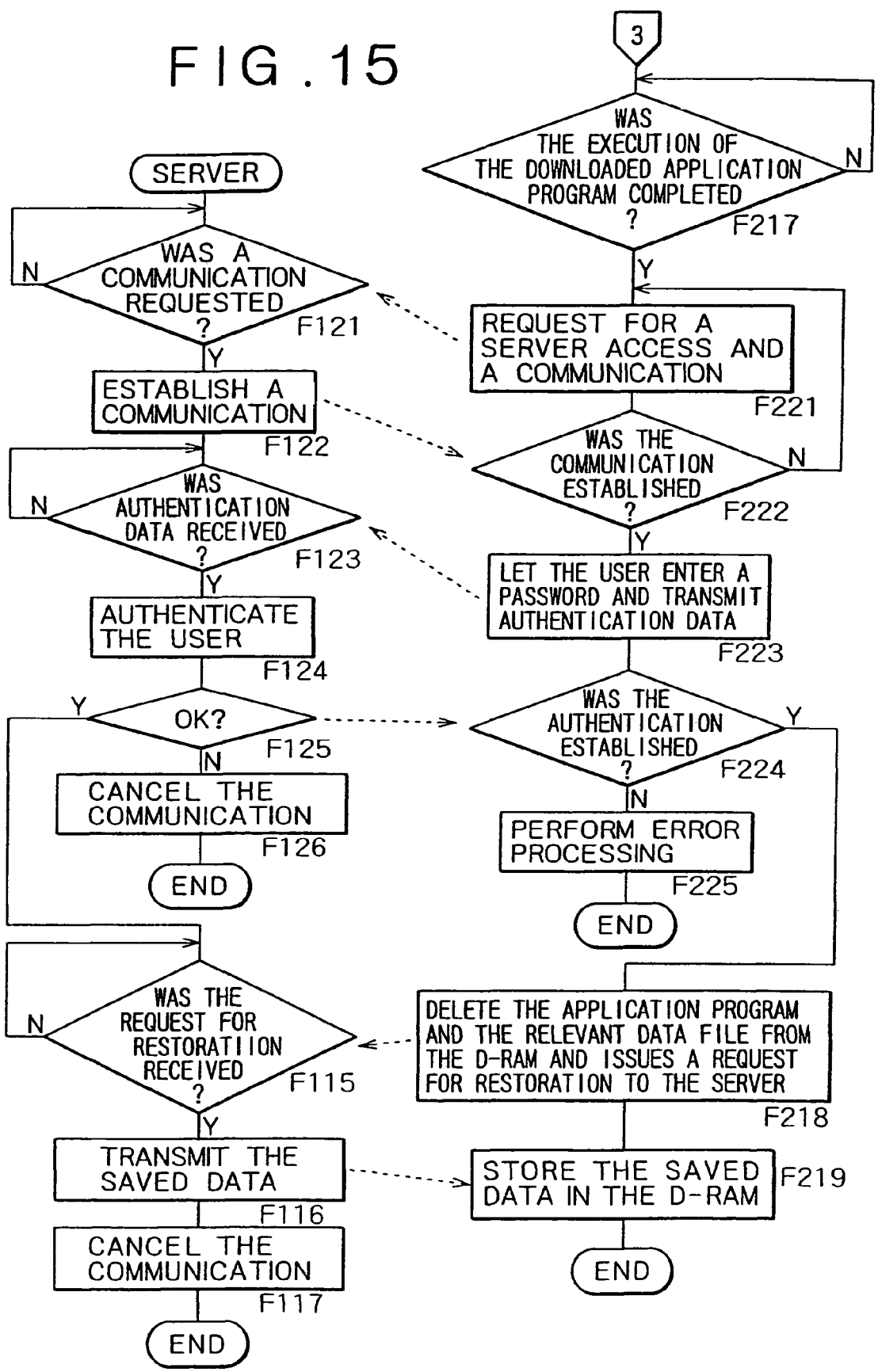
FIG. 15 is continuation flowcharts representing processing to download an application program in the other embodiment.

In order to cancel the communication between the server 130 and the information-processing apparatus 1 once upon completion of the downloading of an application program, processing represented by flowcharts shown in FIGS. 14 and 15 is carried out in place of the processing represented by the flowcharts shown in FIG. 13. It should be noted that the processing represented by the flowcharts shown in FIG. 12 are not included in the flowcharts shown in FIGS. 14 and 15 and not re-explained. In addition, pieces of processing of the flowcharts shown in FIGS. 14 and 15, that are identical with those represented by the flowcharts shown in FIG. 13, are denoted by the same step numbers as the latter.

Pieces of processing carried out by the server 130 at steps F110 to F114 of the left flowchart shown in FIG. 14 are identical with their counterparts in the left flowchart shown in FIG. 13. By the same token, pieces of processing carried out by the information-processing apparatus 1 at steps F209 to F216 of the right flowchart shown in FIG. 14 are identical with their counterparts in the left flowchart shown in FIG. 13.

It should be noted that the server controller 131 cancels the communication at a step F120 to temporarily end the processing after completing the charging process at the step F114.

Even with the communication between the server 130 and the information-processing apparatus 1 canceled, at the step F216, the information-processing apparatus 1 executes the application program downloaded from the server 130.

As the outcome of the judgment formed at the step F217 of the flowchart shown in FIG. 15 indicates that the use of the application program downloaded from the server 130 has been ended, the processing carried out by the CPU 22 goes on to a step F221 at which the CPU 22 makes a request for reestablishment of the communication with the server 130.

At the steps F221 to F225, the CPU 22 carries out processing including transmission of such a request for reestablishment and authentication data in the same way as respectively the steps F201 to F205 of the flowchart shown in FIG. 12.

At the request received from the information-processing apparatus 1, the server controller 131 employed in the server 130 carries out the same processing at steps F121 to F126 the flowchart shown in FIG. 15 in the same way as respectively as the steps F101 to F106 of the flowchart shown in FIG. 12. That is to say, at the request received from the information-processing apparatus 1, the server controller 131 authenticates the user before establishing a communication with the information-processing apparatus 1. If the result of the authentication is NG, the communication is canceled. If the result of the authentication is OK, on the other hand, the flow of the processing goes on from a step F125 to a step F115.

On the other hand, as the result of the judgment formed at the step F224 indicates that an OK authentication result has been received from the server 130, the CPU 22 employed in the information-processing apparatus 1 continues the processing to a step F218.

At the step F218, the CPU 22 puts an application program with the temporary attribute thereof set and a data file relevant to the program in a state of being deleted from the D-RAM 24. The application program with the temporary attribute thereof set is a program that was downloaded from the server 130. Such an application program and a data file relevant thereto are put in a state of being deleted from the D-RAM 24 by typically being transferred to the memory card 70 or merely being erased from the D-RAM 24 to create a free storage area in the D-RAM 24. Then, the CPU 22 then issues a request to the server 130 to restore saved data.

In the mean time, the processing carried out by the server 130 goes on to a step F115 to form a judgment as to whether or not a request for restoration of saved data has been received from the information-processing apparatus 1. If a request for restoration of saved data has been received from the information-processing apparatus 1, the server controller 131 continues the processing to a step F116 at which the saved data is retrieved from the saved-information storage unit 136 and transmitted to the information-processing apparatus 1. After the saved data is transmitted to the information-processing apparatus 1, the flow of the processing goes on to a step F117 at which the communication is canceled before the processing is ended.

At a step F219, the CPU 22 receives the saved data and stores the data back to the D-RAM 24 before terminating the processing. It should be noted that, as the saved application program is restored to the D-RAM 24, the program's saved flag in the application-history table is cleared.

By carrying out the restoration processing, the D-RAM 24 is put back to a state prior to the downloading.

In accordance with the processing represented by the flowcharts shown in FIGS. 14 and 15, the communication is once canceled at the time the downloading of an application program from the server 130 to the information-processing apparatus 1 is completed. As the use of the application program downloaded by the user is ended, a request for reestablishment of the communication is made and, after the user is authenticated, saved data is restored to the information-processing apparatus 1. Thus, while an application program is being used, the communication is not kept in the established state. In addition, the user of the information-processing apparatus 1 is capable of using an application program without worrying about the communication time. Furthermore, congestion of the communication line can be avoided.

The configuration of an embodiment implementing an information-processing apparatus, processing related to application software and other things have been described so far. It should be noted, however, that the scope of the present invention is not limited to details of the embodiment. That is to say, a variety of versions of the embodiment can be thought of.

In addition, applications of the present invention are not limited to a portable information-processing apparatus. Instead, the present invention can also be applied to a broad range of apparatuses.

As is obvious from the above description, in accordance with the present invention, if the storage means employed in the information-processing apparatus does not contain a free area with a storage size large enough for accommodating a desired application program and a data file relevant thereto to be downloaded from a server, the information communication system automatically transfers application programs and data files from the storage means to an external recording medium to be saved therein in order to secure a free storage area in the storage means. The free storage area is used for storing a desired application program and a relevant data file which are to be downloaded from the server.

As a result, there is exhibited an effect of implementation of extremely user-friendly and stressless operations that allow the user to use any arbitrary application program presented by the server without worrying about a memory resource.

As for the server, it is possible to present application programs to a wide range of users and, hence, promote the effective utilization and popularization of the application programs.

When the use of a downloaded application program is ended, the application program and a data file relevant to the program are put in a state of being deleted from the storage means whereas transferred and saved application programs and data files are restored to the storage means to put back the storage means to a state prior to downloading. As a result, the user does not encounter any inconveniences caused by the downloading.

An application program to be transferred from the storage means and saved in the server is selected on the basis of information on an activation history managed and stored in a application-history table which is updated each time an application program is activated. Typically, an application program used least frequently is selected as a program to be transferred from the storage means to the server for saving the program. As a result, it is possible to provide the user with an environment suitable for the user.

What is claimed is:

1. An information-processing apparatus comprising:
   storage means for storing data files;
   communication means for communicating data with an external server apparatus; and
   control means for controlling said communication means and said storage means for storing new data downloaded from said server apparatus via said communication means, if said storage means has free storage area left in which said new data is allowed to be recorded,
   wherein each data file stored in the storage means is associated with a first attribute indicating whether the data file is transferred to the external server apparatus and is saved in the external server apparatus,
   wherein each data file stored in the storage means is associated with a second attribute indicating whether the data file is temporarily installed in the information-processing apparatus and needs to be deleted after a use of the data file,
   wherein if said storage means has no free storage area for recording said new data, the control means selects, based on an activation history, a data file stored in said storage means and transfers said selected data file to the external server apparatus via said communication means in order to allocate free storage area in said storage means, and then the control means records said new data from said server apparatus in said storage means; and then the control means deletes an active data file from said storage means in order to restore said transferred data file from the external server apparatus to said storage means if said data file saved in the external server apparatus exists at completion of use of said active data file downloaded from said server; and further comprising charging means for carrying out a charging process to request a user of said information processing apparatus to pay a cost for downloading said new data.

2. The information-processing apparatus according to claim 1, further comprising:

activation-history management means for storing information on the activation history for each data file and for updating said information on the activation history for a specific data file upon activation of said specific data file.

3. The information-processing apparatus according to claim 1, wherein said storage means is a non-volatile storage area.

4. A server apparatus comprising:

communication means for carrying out communications of data;

downloaded-data storage means for storing a variety of data files to be downloaded;

saved-data storage means; and control means for controlling said communication means, said downloaded-data storage means, and said saved-data storage means;

wherein each data file stored in the saved-data storage means is associated with a first attribute indicating whether the data file is transferred to the server apparatus and is saved in the server apparatus, wherein when said server receives a download request from an information processing apparatus connected to said server apparatus via said communication means, said control means transmits a first data file stored in said downloaded-data storage means to storage means of said information processing apparatus, and when said server apparatus receives a saving request from said information apparatus, said control means stores a second data file transmitted from said storage means of said information processing apparatus in said saved-data storage means as saved data; and wherein when a storage means in said information processing apparatus has no free storage area left in which the first data file is allowed to be recorded, a data file stored in said storage means in said information processing apparatus is selected based on an activation history and is saved to the external server apparatus via said communication means in order to allocate free storage area in said storage means in said information processing apparatus and then said first data file transmitted from said server apparatus is recorded in said storage means, wherein each data file stored in the saved-data storage means is associated with a second attribute indicating whether the data file is temporarily installed in the information processing apparatus in the storage means of the information processing apparatus and needs to be deleted from the storage means after a use of the data file, and wherein an active data file from said storage means is deleted in order to restore said transferred data file from the external server apparatus to said storage means of the information processing apparatus if said data file saved in the external server apparatus exists at completion of use of said active data file downloaded from said server; and further comprising charging means for carrying out a charging process to request a user of said information processing apparatus to pay a cost for transmitting the first data file on the basis of the download request made by said information processing apparatus, and a cost for storing the second data file on the basis of the saving request made by said information processing apparatus.

5. An information communication system including an information-processing apparatus and a server apparatus connected to said information-processing apparatus in a state of being able to exchange data with said information-processing apparatus, said information-processing apparatus comprising:

storage means for storing data files;

communication means for communicating data with said server apparatus; and control means for controlling said communication means and said storage means for storing new data downloaded from said server apparatus via said communication means, wherein each data file stored in the storage means is associated with a first attribute indicating whether the data file is transferred to the external server apparatus and is saved in the external server apparatus, wherein each data file stored in the storage means is associated with a second attribute indicating whether the data file is temporarily installed in the information-processing apparatus and needs to be deleted after a use of the data file, wherein if said storage means has free storage area remaining in which said new data is allowed to be recorded; the control means selects, based on an activation history, a data file stored in said storage means and transfers said selected data file to the server apparatus via said communication means, wherein if said storage means has no free storage area for recording said new data in order to allocate free storage area in said storage means, and then recording said new data from said server apparatus in said storage means, the control means deletes an active data file from said storage means in order to restore said transferred data file from the server apparatus to said storage means if said data file saved in the server apparatus exists at completion of use of said active data file downloaded from said server apparatus, said server apparatus comprising:

communication means for carrying out communications of data;

downloaded-data storage means for storing a variety of data files to be downloaded;

saved-data storage means; and server control means for controlling said communication means, said downloaded-data storage means, and said saved-data storage means;

wherein when said server apparatus receives a download request from said information processing apparatus, said server control means transmits a first data file stored in said downloaded-data storage means to said information processing apparatus, and when said server apparatus receives a saving request from said information processing apparatus, said server control means stores a second data file transmitted from said information processing apparatus in said saved-data storage means as saved data, and an active data file is deleted from said storage means in order to restore said transferred data file from the server apparatus to said storage means if said data file saved in the server apparatus exists at completion of use of said active data file downloaded from said server; and further comprising charging means for carrying out a charging process to request a user of said information processing apparatus to pay a cost for transmitting the first data file on the basis of the download request made by said information processing apparatus, and a cost for storing the second data file on the basis of the saving request made by said information processing apparatus.

6. An information-processing method comprising the steps of:
- storing data files in storage means;
- communicating data with an external server;
- storing new data downloaded from said server if there is free storage area left for storing said new data;
- selecting, based on an activation history, a data file for transferring said selected data file to the external server if there is not free storage area for recording said new data in order to allocate a free storage area;
- storing said new data from said server;
- deleting an active data file from said storage means in order to restore said transferred data file from the external server to said storage means if said data file saved in the external server exists at completion of use of said active data file downloaded from said external server, and
- carrying out a charging process to request a user of said information processing apparatus to pay a cost for downloading said new data;
- wherein each data file stored in the storing step is associated with a first attribute indicating whether the data file is transferred to the server apparatus and is saved in the external server, and
- wherein each data file stored in the storage means is associated with a second attribute indicating whether the data file is temporarily installed in the information-processing apparatus and needs to be deleted after a use of the data file.

7. The information-processing method according to claim 6, further comprising the steps of:
- storing information on the activation history for each data file and updating said information on the activation history for a specific data file upon activation of said specific data file.

8. An information providing method comprising the steps of:
- carrying out communications of data;
- storing a variety of data files to be downloaded;
- transmitting a first data file to be downloaded from an external server apparatus to storage means of an information processing apparatus in response to a download request from said information processing apparatus, and storing a second data file transmitted from said information processing apparatus when a saving request is received from said information processing apparatus;
- wherein the second data file is associated with a first attribute indicating whether the data file is transferred from the information processing apparatus,
- wherein the second data file stored is associated with a second attribute indicating whether the data file is temporarily installed in the information-processing apparatus in the storage means of the information processing apparatus and needs to be deleted after a use of the second data file,
- selecting a data file, based on an activation history, for saving in the external server apparatus when no free storage area is left for storing said second data file, thereby allocating a free storage area;
- transmitting said first data file to said information processing apparatus for storing at said information processing apparatus;
- deleting an active data file from said storage means in order to restore said transferred data file from the external server apparatus to said storage means if said data file saved in the external server apparatus exists at completion of use of said active data file downloaded from said server; and
- carrying out a charging process to request a user of said information processing apparatus to pay a cost for transmitting the first data file on the basis of the download request made by said information processing apparatus, and a cost for storing the second data file on the basis of the saving request made by said information processing apparatus.

9. A non-transitory computer-readable storage medium having an information processing program stored therein that when executed causes a processing device to perform the steps of:
- storing data files, comprising electronic representations of data;
- communicating data with an external server apparatus;
- storing new data, the new data being an electronic representation, downloaded from said server apparatus if there is free storage area left for storing said new data;
- wherein each data file stored in the storing step is associated with a first attribute indicating whether the data file is transferred to the external server apparatus and is saved in the external server apparatus,
- wherein each data file stored in the storing step is associated with a second attribute indicating whether the data file is temporarily installed in the processing device and needs to be deleted after a use of the data file,
- selecting, based on an activation history, a data file for transferring said selected data file to the external server apparatus if there is no free storage area for recording said new data in order to allocate free storage area;
- storing said new data from said server apparatus;
- deleting an active data file from said storage means in order to restore said transferred data file from the external server apparatus to said storage means if said data file saved in the external server apparatus exists at completion of use of said active data file downloaded from said server; and
- carrying out a charging process to request a user of said information processing apparatus to pay a cost for downloading said new data.

10. The computer-readable storage medium having the information-processing program according to claim 9, to cause the processing device to perform the further steps of:
- storing information on the activation history for each data file and updating said information on the activation history for a specific data file upon activation of said specific data file.

11. A non-transitory computer-readable storage medium having an information processing program stored therein that when executed causes a processing device to perform the steps of:
- carrying out communications of data, the data being an electronic representation of data;
- storing a variety of data files to be downloaded;
- transmitting a first data file to be downloaded from an external sever apparatus to storage means of an information processing apparatus in response to a download request from said information processing apparatus, and storing a second data file transmitted from said information processing apparatus when a saving request is received from said information processing apparatus;

wherein the second data file is associated with a first attribute indicating whether the data file is transferred from the information processing apparatus, wherein the second data file is associated with a second attribute indicating whether the data file is temporarily installed in the information-processing apparatus in the storage means of the information processing apparatus and needs to be deleted after a use of the second data file, selecting a data file, based on an activation history, for saving in the external server apparatus when no free storage area is left for storing said second data file, thereby allocating free storage area;

transmitting said first data file to said information processing apparatus for storing at said information processing apparatus;

deleting an active data file from said storage means in order to restore said transferred data file from the external server apparatus to said storage means if said data file saved in the external server apparatus exists at completion of use of said active data file downloaded from said server; and carrying out a charging process to request a user of said information processing apparatus to pay a cost for transmitting the first data file on the basis of the download request made by said information processing apparatus, and a cost for storing the second data file on the basis of the saving request made by said information processing apparatus.

12. An information-processing apparatus comprising:
a storage unit that stores data files;
a communication unit that communicates data with an external server apparatus; and
a control unit that controls said communication unit and said storage unit for storing new data downloaded from said external server apparatus via said communication unit,
wherein each data file stored in the storage unit is associated with a first attribute indicating whether the data file is transferred to the external server apparatus and is saved in the external server apparatus,
wherein each data file stored in the storage unit is associated with a second attribute indicating whether the data file is temporarily installed in the information-processing apparatus and needs to be deleted after a use of the data file,
wherein if said storage unit has free storage area left in which said new data is allowed to be recorded; the control unit selects, based on an activation history, a data file stored in said storage unit and transfers said selected data file to the external server apparatus via said communication unit,
wherein if said storage unit has no free storage area for recording said new data in order to allocate free storage area in said storage unit, and then recording said new data from said server apparatus in said storage unit; the control unit deletes an active data file from said storage unit in order to restore said transferred data file from the external server apparatus to said storage unit if said data file saved in the external server apparatus exists at completion of use of said active data file downloaded from said server; and
further comprising charging means for carrying out a charging process to request a user of said information processing apparatus to pay a cost for downloading said new data.

13. The information-processing apparatus according to claim 12, further comprising:

an activation-history management unit that stores information on the activation history for each data file and for updating said information on the activation history for a specific data file upon activation of said specific data file.

14. The information-processing apparatus according to claim 12, wherein said storage unit is a non-volatile storage area.

15. A server apparatus comprising:
a communication unit that carries out communications of data;
a downloaded-data storage unit that stores a variety of data files to be downloaded;
a saved-data storage unit; and
a control unit that controls said communication unit, said downloaded-data storage unit, and said saved-data storage unit;
wherein each data file stored in the saved-data storage unit is associated with a first attribute indicating whether the data file is transferred to the server apparatus and is saved in the server apparatus,
wherein when said server receives a download request from an information processing apparatus connected to said server apparatus via said communication unit, said control unit transmits a first data file stored in said downloaded-data storage unit to a storage unit of said information processing apparatus, and when said server apparatus receives a saving request from said information apparatus, said control unit stores a second data file transmitted from said information processing apparatus in said saved-data storage unit as saved data; and
wherein when a storage unit in said information processing apparatus has no free storage area left in which the first data file is allowed to be recorded, a data file stored in said storage unit in said information processing apparatus and selected based on an activation history is saved to the server apparatus via said communication unit in order to allocate free storage area in said storage unit in said information processing apparatus and then said first data file transmitted from said server apparatus is recorded in said storage unit,
wherein each data file stored in the saved-data storage unit is associated with a second attribute indicating whether the data file is temporarily installed in the information-processing apparatus in the storage unit of the information processing apparatus and needs to be deleted after a use of the data file,
wherein an active data file from said storage unit is deleted in order to restore said transferred data file from the server apparatus to said storage unit if said data file saved in the server apparatus exists at completion of use of said active data file downloaded from said server; and
further comprising a charging unit for carrying out a charging process to request a user of said information processing apparatus to pay a cost for transmitting the first data file on the basis of the download request made by said information processing apparatus, and a cost for storing the second data file on the basis of the saving request made by said information processing apparatus.

16. An information communication system including an information-processing apparatus and a server apparatus connected to said information-processing apparatus in a state of being able to exchange data with said information-processing apparatus,
said information-processing apparatus comprising:
a storage unit that stores data files;
a communication unit that communicates data with said server apparatus; and a control unit that controls said communication unit and said storage unit for storing new data downloaded from said server apparatus via said communication unit, wherein each data file stored in the storage unit is associated with a first attribute indicating whether the data file is transferred to the server apparatus and is saved in the server apparatus, wherein each data file stored in the storage unit is associated with a second attribute indicating whether the data file is temporarily installed in the information-processing apparatus and needs to be deleted after a use of the data file, wherein if said storage unit has free storage area remaining in which said new data is allowed to be recorded; the control unit selects, based on an activation history, a data file stored in said storage unit and transfers said selected data file to an external recording medium via said communication unit, wherein if said storage unit has no free storage area for recording said new data in order to allocate free storage area in said storage unit, and then recording said new data from said server apparatus in said storage unit, the control unit deletes an active data file from said storage unit in order to restore said transferred data file from said external recording medium to said storage unit if said data file saved in said external recording medium exists at completion of use of said active data file downloaded from said server, said server apparatus comprising:

a second communication unit that carries out communications of data;

a downloaded-data storage unit that stores a variety of data files to be downloaded;

a saved-data storage unit; and a server control unit that controls said second communication unit, said downloaded-data storage unit, and said saved-data storage unit;

wherein when said server apparatus receives a download request from said information processing apparatus, said server control unit transmits a first data file stored in said downloaded-data storage unit to said information processing apparatus, and when said server apparatus receives a saving request from said information processing apparatus, said server control unit stores a second data file transmitted from said information processing apparatus in said saved-data storage unit as saved data, and an active data file is deleted from said storage unit in order to restore said transferred data file from the server apparatus to said storage unit if said data file saved in the server apparatus exists at completion of use of said active data file downloaded from said server apparatus; and further comprising a charging unit that carries out a charging process to request a user of said information processing apparatus to pay a cost for transmitting the first data file on the basis of the download request made by said information processing apparatus, and a cost for storing the second data file on the basis of the saving request made by said information processing apparatus.

* * * * *